(12) United States Patent
Tochikubo et al.

(10) Patent No.: US 11,373,681 B2
(45) Date of Patent: Jun. 28, 2022

(54) CARTRIDGE MEMORY USED FOR TAPE CARTRIDGE, TAPE CARTRIDGE, DATA MANAGEMENT SYSTEM, AND CARTRIDGE MEMORY USED FOR RECORDING MEDIUM CARTRIDGE

(71) Applicant: Sony Corporation, Tokyo (JP)

(72) Inventors: Shinya Tochikubo, Tokyo (JP); Takanobu Iwama, Tokyo (JP); Kazuo Anno, Tokyo (JP); Eiji Nakashio, Tokyo (JP); Naohiro Adachi, Tokyo (JP); Minoru Yamaga, Tokyo (JP); Masayoshi Abe, Kanagawa (JP); Munetake Ebihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/265,449

(22) PCT Filed: Aug. 2, 2019

(86) PCT No.: PCT/JP2019/030571
§ 371 (c)(1),
(2) Date: Feb. 2, 2021

(87) PCT Pub. No.: WO2020/027331
PCT Pub. Date: Feb. 6, 2020

(65) Prior Publication Data
US 2021/0233567 A1    Jul. 29, 2021

(30) Foreign Application Priority Data
Aug. 2, 2018 (JP) .............................. JP2018-146334

(51) Int. Cl.
*G11B 5/78*         (2006.01)
*G06K 19/07*        (2006.01)

(52) U.S. Cl.
CPC ............ *G11B 5/78* (2013.01); *G06K 19/0723* (2013.01)

(58) Field of Classification Search
CPC ......... G11B 5/78; G11B 23/107; G11B 23/30; G06K 19/0723
See application file for complete search history.

(56) References Cited

U.S. PATENT DOCUMENTS 7,227,721 B1 *   6/2007   Kientz ................. G11B 23/042
                                                              360/132
7,251,092 B2 *   7/2007   Reasoner ............. G11B 23/042
                                                              360/92.1
(Continued)

FOREIGN PATENT DOCUMENTS

JP    2002-251861 A    9/2002
JP    2003-109353 A    4/2003
(Continued)

OTHER PUBLICATIONS

International Search Report for Application No. PCT/JP2019/030571, dated Sep. 24, 2019.

*Primary Examiner* — Brian E Miller
(74) *Attorney, Agent, or Firm* — K&L Gates LLP

(57) ABSTRACT

A cartridge memory used for a tape cartridge, the cartridge memory including a communication unit that performs wireless communication, a control unit that transmits data to a recording/reproduction device according to a first communication standard via the communication unit, receives data from the recording/reproduction device according to the first communication standard via the communication unit, and transmits data to an information terminal according to a second communication standard via the communication unit, and a storage unit that stores data related to the tape cartridge.

17 Claims, 16 Drawing Sheets

(56) References Cited

U.S. PATENT DOCUMENTS

| | | | |
|---|---|---|---|
| 8,640,964 B2* | 2/2014 | Bates | G01N 33/48778 235/492 |
| 9,417,237 B2* | 8/2016 | Haustein | B01L 3/545 |
| 10,867,630 B2* | 12/2020 | Sekiguchi | C23C 14/562 |
| 2002/0191322 A1* | 12/2002 | Jerman | G11B 23/107 360/69 |
| 2003/0026021 A1* | 2/2003 | Goodman | G11B 27/11 360/48 |
| 2004/0004145 A1* | 1/2004 | Stamm | G11B 23/107 242/348 |
| 2006/0139804 A1* | 6/2006 | Kitamura | G11B 23/08714 360/132 |
| 2006/0161935 A1* | 7/2006 | Johnson | G11B 23/0303 720/645 |
| 2006/0180694 A1* | 8/2006 | Battles | G11B 23/107 242/348 |
| 2007/0206309 A1* | 9/2007 | Bates | G11B 23/107 360/55 |
| 2008/0218901 A1* | 9/2008 | Haustein | G11B 23/107 360/90 |
| 2011/0216444 A1* | 9/2011 | Brume | G11B 5/78 360/134 |
| 2014/0143796 A1* | 5/2014 | Chiba | G11B 23/283 720/725 |
| 2019/0130647 A1* | 5/2019 | Qin | G06F 3/011 |
| 2020/0185001 A1* | 6/2020 | Winarski | G11B 5/78 |
| 2020/0321033 A1* | 10/2020 | Nakashio | G11B 23/0312 |
| 2020/0336295 A1* | 10/2020 | Winarski | G11B 5/78 |
| 2020/0357434 A1* | 11/2020 | Yamaga | G11B 5/66 |
| 2020/0357437 A1* | 11/2020 | Yamaga | G11B 5/70 |
| 2021/0012804 A1* | 1/2021 | Nakashio | G11B 33/04 |
| 2021/0027803 A1* | 1/2021 | Adachi | G11B 20/1803 |
| 2021/0034943 A1* | 2/2021 | Nakano | G11B 23/027 |
| 2021/0233567 A1* | 7/2021 | Tochikubo | G11B 23/30 |
| 2021/0241793 A1* | 8/2021 | Anno | G11B 23/107 |
| 2021/0249044 A1* | 8/2021 | Nakashio | G11B 23/107 |

FOREIGN PATENT DOCUMENTS

| | | |
|---|---|---|
| JP | 2005-108271 A | 4/2005 |
| JP | 2014-102863 A | 6/2014 |

* cited by examiner

FIG. 6
A
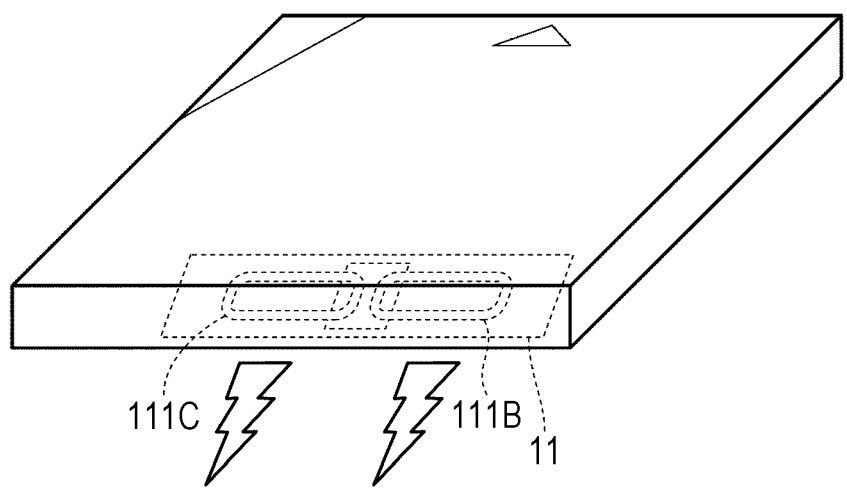
B
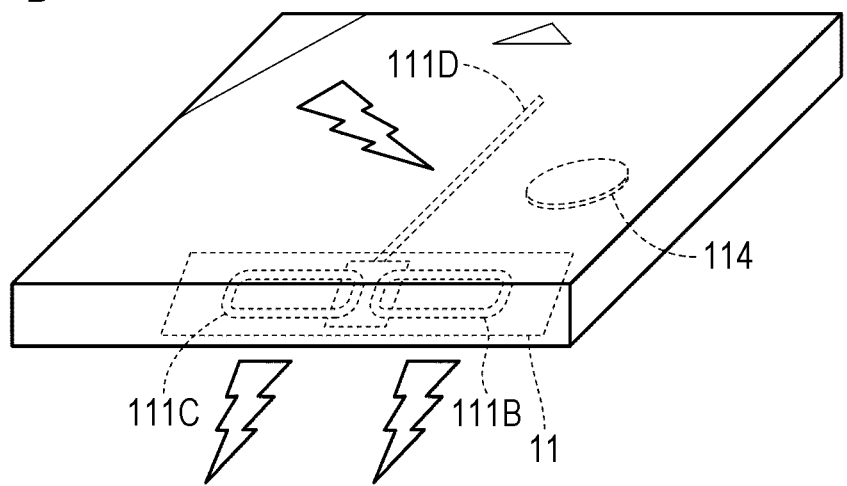

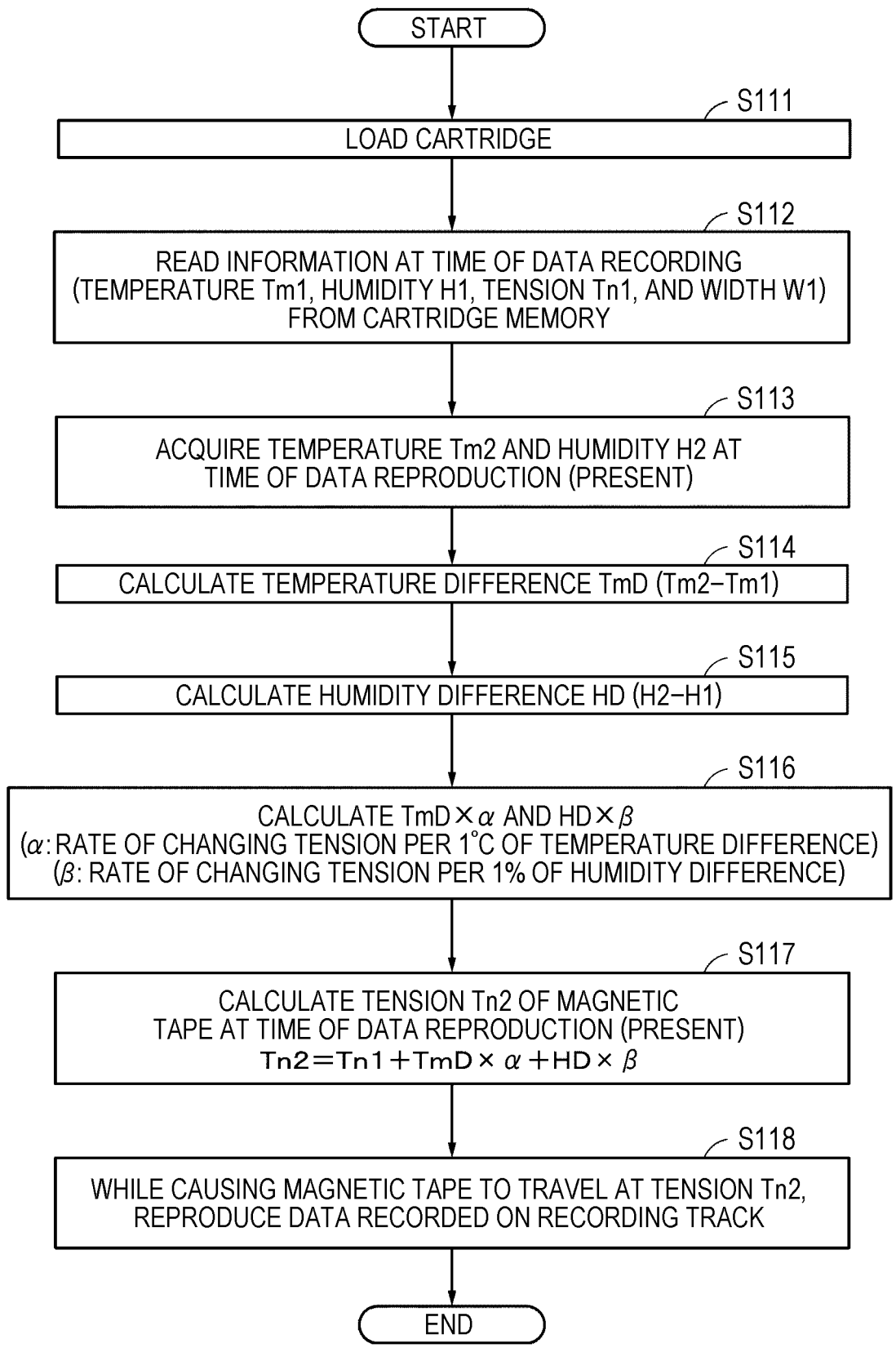

CARTRIDGE MEMORY USED FOR TAPE CARTRIDGE, TAPE CARTRIDGE, DATA MANAGEMENT SYSTEM, AND CARTRIDGE MEMORY USED FOR RECORDING MEDIUM CARTRIDGE

TECHNICAL FIELD

The present disclosure relates to a cartridge memory, a tape cartridge, and a data management system.

BACKGROUND ART

Magnetic recording media are widely used for storing electronic data. In particular, a magnetic tape, whose cost per data unit capacity is low, has been attracting attention again and is used at a data center and the like together with a hard disk drive (HDD) as a recording medium used in a cloud storage service.

As for the magnetic tape, the Linier Tape-Open (LTO) Ultrium standard magnetic tape is widely used. The LTO Ultrium standard tape cartridge includes a built-in non-contact non-volatile memory using RF wireless communication called a cartridge memory (CM) (for example, refer to Patent Document 1). For example, data such as manufacturing information, drive usage history, vendor-specific management information, and the like are written in the cartridge memory. After the cartridge is loaded into a drive, the drive reads the data described above from the cartridge memory, so that it is possible to check the usage status and the like of the cartridge in a short time.

CITATION LIST

Patent Document

Patent Document 1: Japanese Patent Application Laid-Open No. 2003-109353

SUMMARY OF THE INVENTION

Problems to be Solved by the Invention

Although it is possible to access the cartridge memory without loading the tape cartridge into the data drive by using a dedicated reader/writer device compliant with the LTO Ultrium standard, the dedicated reader/writer device is not widely used in general. Therefore, it is difficult for a user to access the cartridge memory of the tape cartridge taken out from a library device or the like or the cartridge memory of the tape cartridge managed on the shelf.

An object of the present disclosure is to provide a cartridge memory, a tape cartridge, and a data management system capable of reading data by an information terminal.

Solutions to Problems

In order to solve the problems described above, the first disclosure is a cartridge memory used for a tape cartridge, and the cartridge memory includes a communication unit that performs wireless communication, a control unit that transmits data to a recording/reproduction device according to a first communication standard via the communication unit, receives data from the recording/reproduction device according to the first communication standard via the communication unit, and transmits data to an information terminal according to a second communication standard via the communication unit, and a storage unit that stores data related to the tape cartridge.

The second disclosure is a tape cartridge that includes the cartridge memory of the first disclosure.

The third disclosure is a data management system that includes a tape cartridge including a cartridge memory and an information terminal that reads data from the cartridge memory, and the tape cartridge is the cartridge memory of the first disclosure.

The fourth disclosure is a cartridge memory used for a recording medium cartridge, and the cartridge memory includes a communication unit that performs wireless communication, a control unit that transmits data to a recording/reproduction device according to a first communication standard via the communication unit, receives data from the recording/reproduction device according to the first communication standard via the communication unit, and transmits data to an information terminal according to a second communication standard via the communication unit, and a storage unit that stores data related to the recording medium cartridge.

In the fourth disclosure, the recording medium cartridge is preferably a magnetic tape cartridge or an optical disk cartridge.

Effects of the Invention

According to the present disclosure, it is possible to read data by using an information terminal. Note that, the effects described in the present disclosure are not necessarily limited, and the effects described in the present disclosure may be any of the effects described in the present disclosure or an effect different from the effects described in the present disclosure.

BRIEF DESCRIPTION OF DRAWINGS

FIGS. 6A and 6B are perspective views each illustrating a modified example of the tape cartridge.

FIG. 18 is a flowchart for explaining an example of an operation of the recording/reproduction device at the time of data reproduction.

MODE FOR CARRYING OUT THE INVENTION

Figure 1:
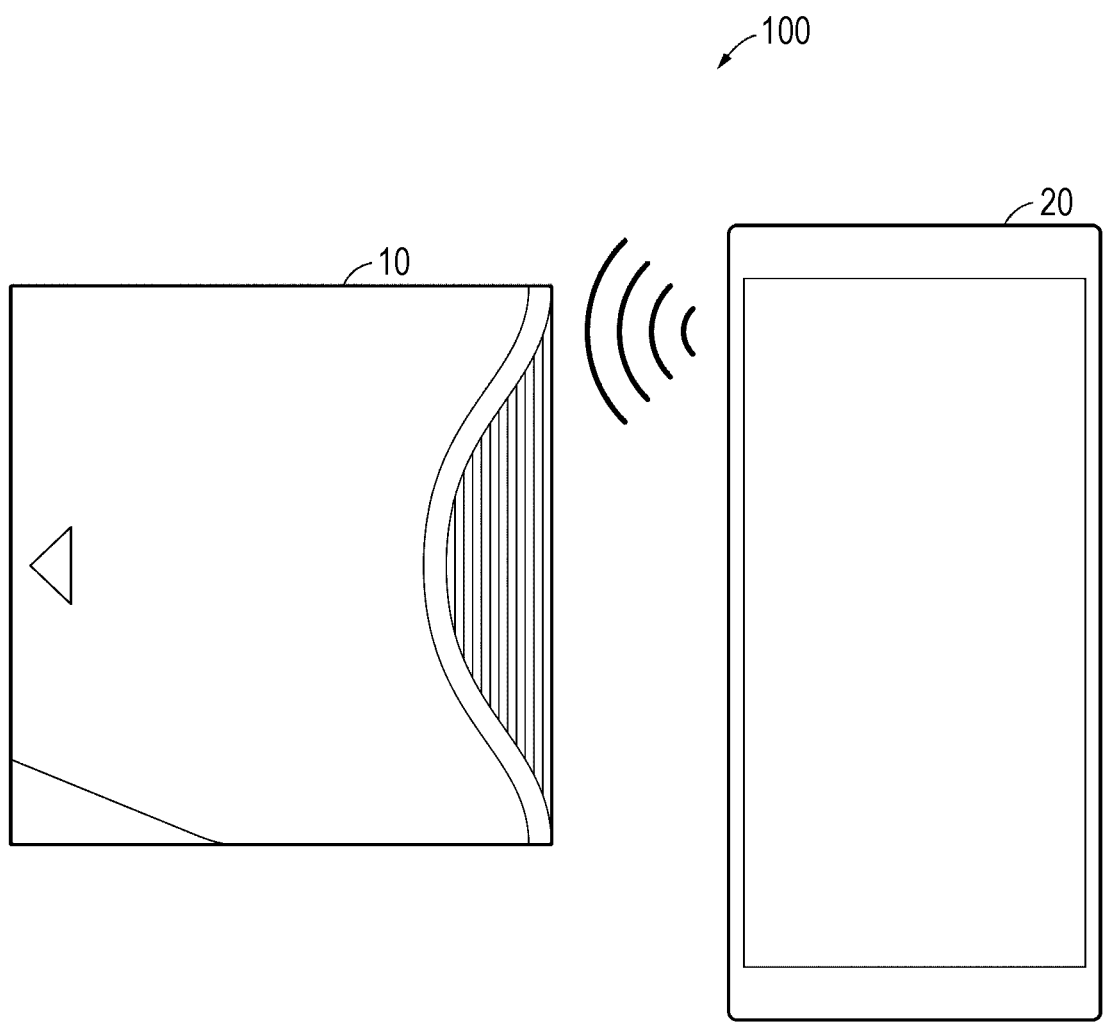
FIG. 1 is a schematic diagram illustrating an example of a configuration of a data management system according to the first embodiment of the present disclosure.

The embodiments of the present disclosure will be described in the following order.
1 First Embodiment
1.1 Configuration of data management system
1.2 Configuration of tape cartridge
1.3 Configuration of cartridge memory
1.4 Configuration of magnetic tape
1.5 Configuration of information terminal
1.6 Operation of data management system
1.7 Effect
2 Second Embodiment
2.1 Configuration of recording/reproduction system
2.2 Configuration of tape cartridge
2.3 Configuration of recording/reproduction device
2.4 Operation of recording/reproduction device at the time of data recording
2.5 Operation of recording/reproduction device at the time of data reproduction
2.6 Effect
3 Third Embodiment
3.1 Configuration of recording/reproduction device
3.2 Operation of recording/reproduction device at the time of data recording
3.3 Operation of recording/reproduction device at the time of data reproduction
3.4 Effect
4 Modification Example

[1.1 Configuration of Data Management System]

FIG. 1 illustrates an example a configuration of a data management system 100 according to the first embodiment of the present disclosure. The data management system 100 includes a tape cartridge 10 including a cartridge memory (hereinafter referred to as "CM") not illustrated in the drawings and an information terminal 20 that communicates with the CM by short-range wireless communication and reads data from the CM.

The tape cartridge 10 is configured to be capable of being loaded into and unloaded from a recording/reproduction device (a linear tape drive). The recording/reproduction device includes a reader/writer, and after the tape cartridge 10 is loaded into the recording/reproduction device, the reader/writer transmits and receives data to and from the CM of the cartridge memory being loaded.

[1.2 Configuration of Tape Cartridge]

Figure 2:
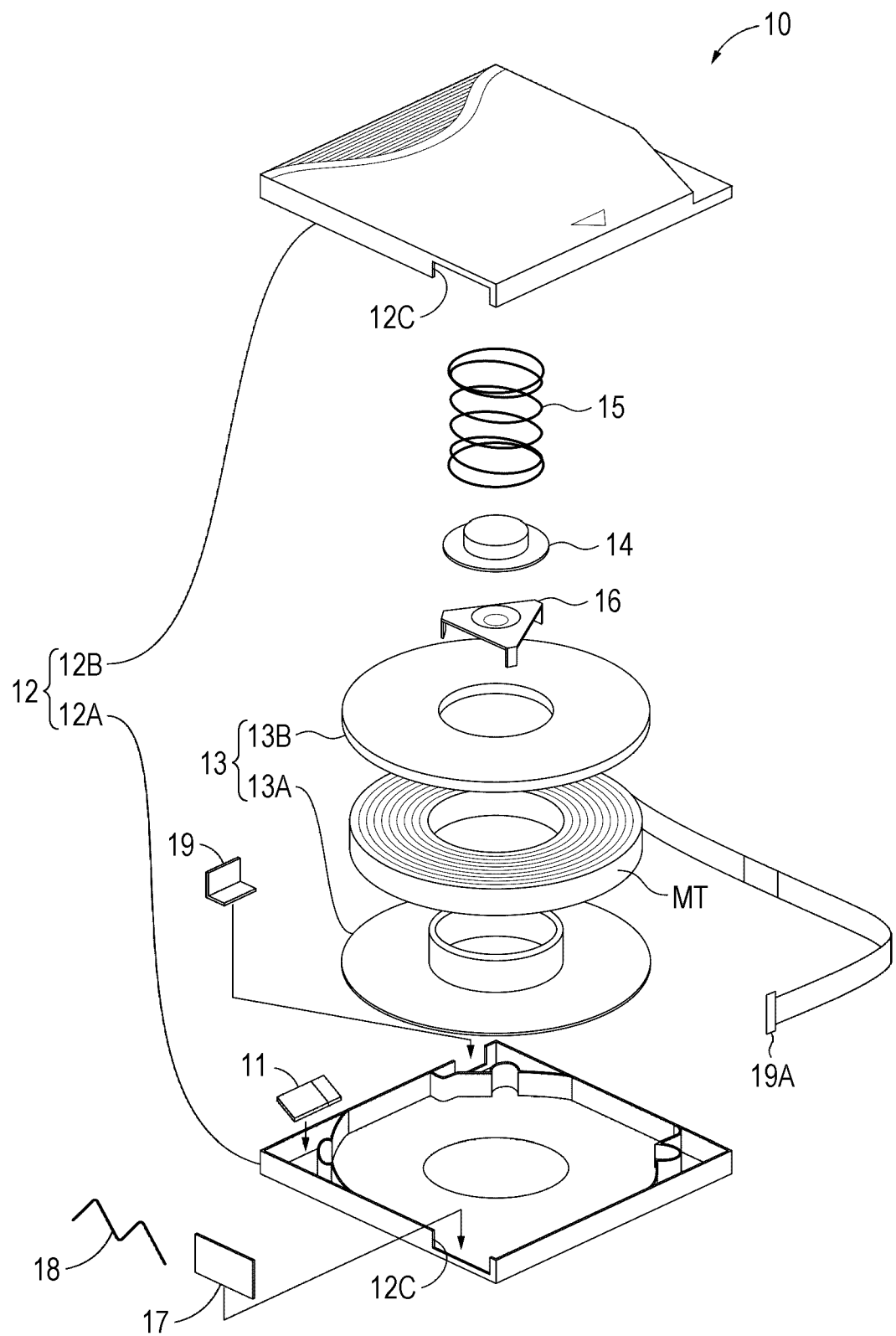
FIG. 2 is an exploded perspective view illustrating an example of a configuration of a tape cartridge.

FIG. 2 illustrates an example of a configuration of the tape cartridge 10. The tape cartridge 10 is a tape cartridge compliant with the LTO standard and includes a reel 13 on which a magnetic tape MT is wound inside a cartridge case 12 including a lower shell 12A and an upper shell 12B, a reel lock 14 and a reel spring 15 for locking a rotation of the reel 13, a spider 16 for releasing the locked state of the reel 13, a sliding door 17 for opening and closing a tape outlet 12C provided on the cartridge case 12 straddling the lower shell 12A and the upper shell 12B, a door spring 18 for urging the sliding door 17 to a closed position of the tape outlet 12C, a write protection 19 for preventing data from being erased by mistake, and the CM 11 described above. The reel 13 has a substantial disk shape having an opening in the center and includes a reel hub 13A and a flange 13B including a hard material such as plastic and the like.

The CM 11 is configured to be able to communicate with the recording/reproduction device according to a first communication standard and to communicate with the information terminal 20 according to the second communication standard. Here, the first communication standard is the communication standard defined for the CM 11 in the Linear Tape-Open (LTO) standard (hereinafter referred to as "LTO-specified communication standard"), and the second communication standard is a near field communication (NFC) standard.

The communication standard of the LTO standard is a short-range wireless communication standard customized for LTO based on the Type A method of ISO 14443-2 (NXP). The NFC standard is a short-range wireless communication standard that supports the communication methods of ISO 14443 and FeliCa (registered trademark). Note that the LTO standard may be any of LTO 1 to 8, or the LTO standard may be LTO 9 or later expected to be developed in the future.

The CM 11 is provided near one corner of the tape cartridge 10. Visual information (not illustrated in the drawings) indicating that it is possible to perform communication according to the second communication standard is marked at a position near the corner. Here, the visual information is, for example, a logo, a mark, or the like.

[1.3 Configuration of Cartridge Memory]

Figure 3:
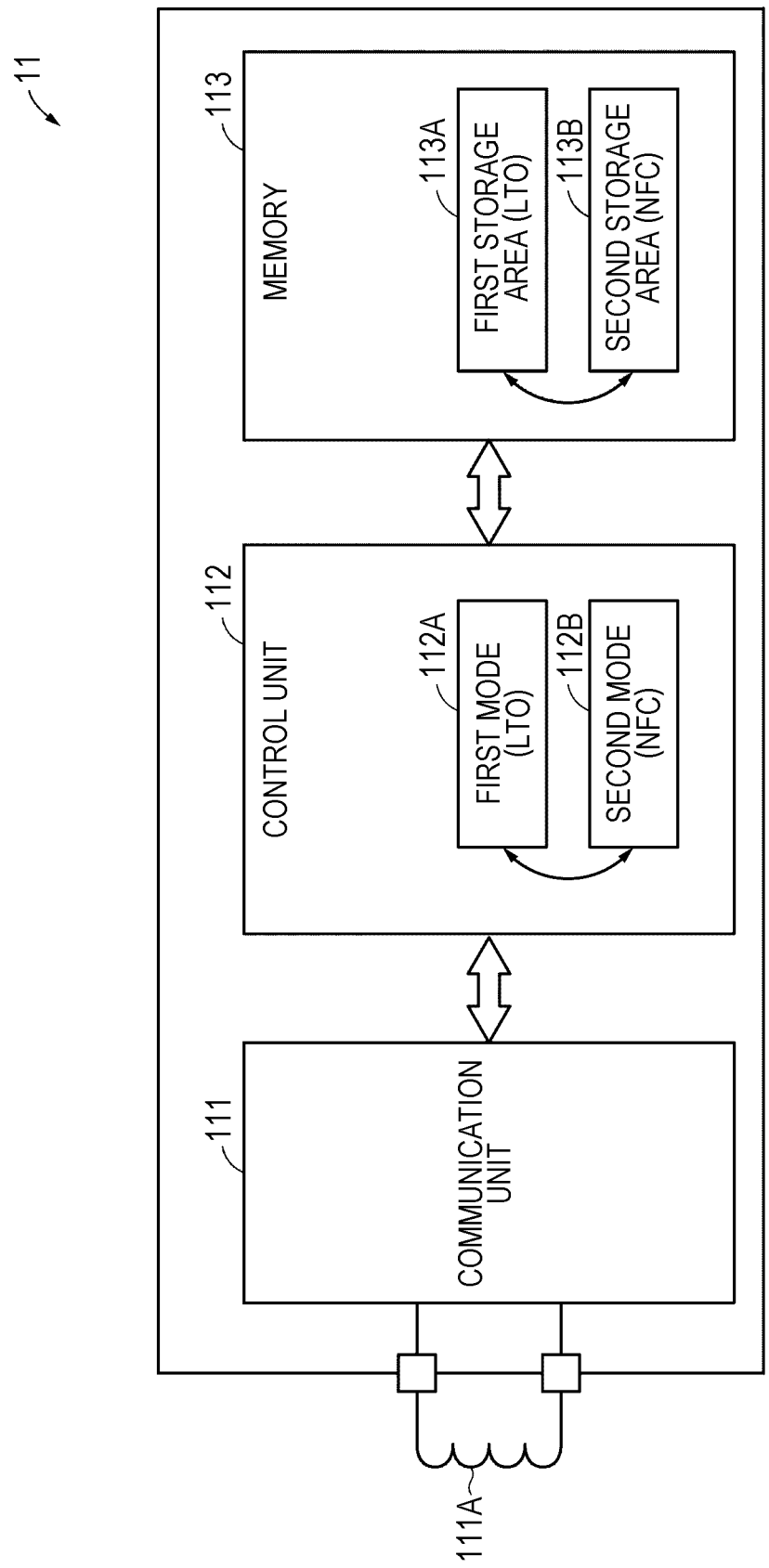
FIG. 3 is a block diagram illustrating an example of a configuration of a cartridge memory.

FIG. 3 illustrates a configuration of the CM 11 used for the tape cartridge 10. The CM 11 includes a communication unit 111 including an antenna coil 111A, a control unit 112, and a memory (a storage unit) 113.

(Communication Unit)

The communication unit 111 is compliant with both the first communication standard and the second communication standard. Also, a command system is compliant with both the first communication standard and the second communication standard. Specifically, a command system used for communication with the recording/reproduction device (an LTO drive) is compliant with the first communication standard, and a command system used for notification with the information terminal 20 is compliant with the second communication standard.

The communication unit 111 communicates with the recording/reproduction device or the information terminal 20 by the antenna coil 111A. Also, the antenna coil 111A receives an AC magnetic field emitted from the reader/writer of the recording/reproduction device or the reader/writer (an NFC communication unit) of the information terminal 20 to induce an AC voltage and supplies the AC voltage to the control unit 112. Also, the communication unit 111 processes analog signals transmitted and received by the antenna coil 111A such as detection, modulation/demodulation, clock extraction, and the like.

(Memory)

The memory 113 stores data related to the tape cartridge 10. The memory 113 is a non-volatile memory (NVM) and has a storage capacity larger than a storage capacity defined by the LTO standard that is a magnetic tape standard. For example, in a case where the tape cartridge 10 is compliant with the LTO-8 standard, the memory 113 has a storage capacity in excess of 16 KB.

As the non-volatile memory, an electrically erasable programmable read-only memory (EEPROM) is generally used, but a magnetoresistive random access memory (MRAM), a resistive random access memory (ReRAM), and the like may be used.

The memory 113 includes a first storage area 113A and a second storage area 113B. The first storage area 113A is an area in which data compliant with the LTO standard (that is, data of a general CM) is stored and corresponds to a storage area of a general CM compliant with the LTO standard. Data compliant with the LTO standard are, for example, manufacturing information (for example, a unique number of the tape cartridge 10 and the like), a usage history (for example, the number of times the tape is pulled out (a thread count) and the like), and the like. The recording/reproduction device can both read and write the data in the first storage area 113A, whereas the information terminal 20 can only read the data in the first storage area 113A.

The second storage area 113B corresponds to an extended storage area with respect to a storage area of a general CM. First additional data (first additional information) is stored in the second storage area 113B. Here, the first additional data means data related to the tape cartridge 10 that is not specified by the LTO standard. Examples of the first additional data include, but are not limited to, management ledger data, index information, thumbnail information of moving images stored in the magnetic tape MT, or the like. The recording/reproduction device can neither read nor write the data in the second storage area 113B, whereas the information terminal 20 can both read and write the data in the second storage area 113B.

The memory 113 may include a plurality of banks. In this case, a part of the plurality of banks comprises the first storage area 113A, and the remaining banks comprise the second storage area 113B. Specifically, for example, in a case where the tape cartridge 10 is compliant with the LTO-8 standard, each bank has a storage capacity of 16 KB, and one of the plurality of banks comprises a first storage area 113A, and the remaining banks comprise the second storage area 113B.

(Control Unit)

The control unit 112 generates and rectifies power using the AC voltage supplied from the antenna coil 111A to generate a power source and controls the communication unit 111 and the memory 113. The control unit 112 communicates with the recording/reproduction device or the information terminal 20 via the antenna coil 111A. Specifically, for example, mutual authentication, command transmission/reception, and data exchange are performed.

The control unit 112 is configured to be able to switch between the first mode and the second mode. The first mode is a mode for communicating with the recording/reproduction device, and the second mode is a mode for communicating with the information terminal 20. In the first mode, the control unit 112 transmits data to the recording/reproduction device and receives data from the recording/reproduction device according to the first communication standard in response to a request from the recording/reproduction device. In the second mode, the control unit 112 transmits data to the information terminal 20 and receives data from the recording/reproduction device according to the second communication standard in response to a request from the information terminal 20.

The control unit 112 determines whether an adjacent communication target device is the recording/reproduction device or the information terminal 20 on the basis of a command received from a communication target device via the communication unit 111. In a case where the control unit 112 determines that the adjacent communication target device is the recording/reproduction device, the control unit 112 transitions to the first mode, and in a case the control unit 112 determines that the adjacent communication target device is the information terminal 20, the control unit 112 transitions to the second mode. More specifically, in a case where the control unit 112 receives a Request All (4A) command or a Request Standard (45) command from the adjacent communication target device via the communication unit 111, the control unit 112 transitions to the first mode. Also, in a case where the control unit 112 receives a REQA (26) command or a WUPA (52) command from the adjacent communication target device via the communication unit 111, the control unit 112 transitions to the second mode. Here, the REQA command stands for "REQuest command, Type A", and the WUPA command stands for "Wake-UP command, Type A". Also, the Request All command, the Request Standard command, the REQA command, and the WUPA command are commands that perform a polling operation to detect whether or not a tag, the communication target device, or the like compliant with the standard exists.

The control unit 112 stores data received from the recording/reproduction device according to the first communication standard in the first storage area 113A in response to a request from the recording/reproduction device. Also, the control unit 112 reads data from the first storage area 113A and transmits the data to the recording/reproduction device according to the first communication standard in response to a request from the recording/reproduction device.

The control unit 112 stores data received from the information terminal 20 according to the second communication standard in the second storage area 113B in response to the request from the information terminal 20. Also, the control unit 112 reads data from the first storage area 113A or the second storage area 113B in response to a request from the information terminal 20 and transmits the data to the information terminal 20 according to the second communication standard.

[1.4 Configuration of Magnetic Tape]

Figure 7:
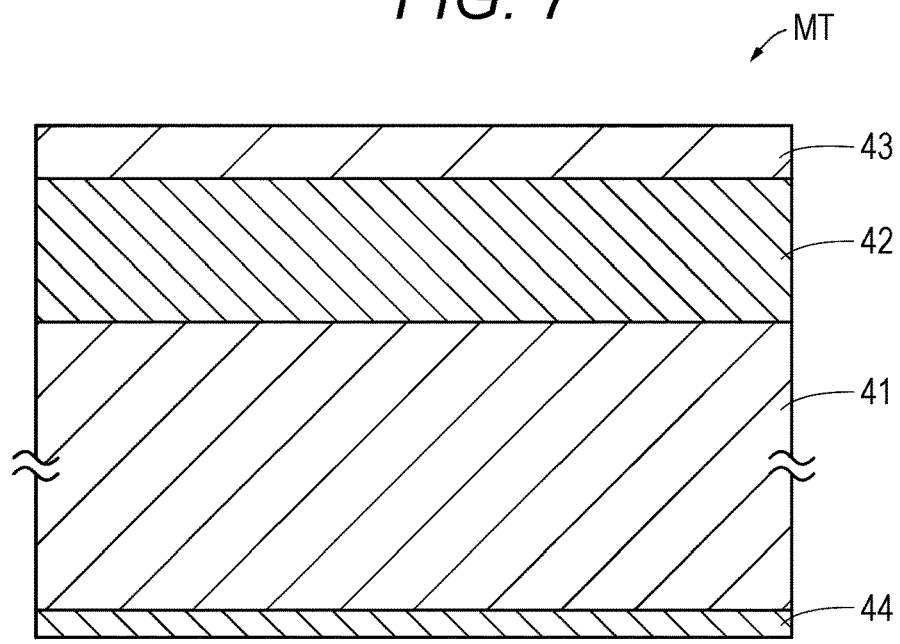
FIG. 7 is a cross-sectional view illustrating an example of a configuration of a magnetic tape.

FIG. 7 is a cross-sectional view illustrating an example of a configuration of the magnetic tape MT. The magnetic tape MT is a so-called perpendicular recording type tape-shaped magnetic recording medium and includes a base 41 having a long shape, a base layer 42 provided on one main surface (a first main surface) of the base 41, a magnetic layer 43 provided on the base layer 42, and a back layer 44 provided on the other main surface (a second main surface) of the base 41. Note that the base layer 42 and the back layer 44 are provided as needed and may not be provided.

The magnetic tape MT has a long tape shape and runs in the longitudinal direction when recording and reproducing. Note that a surface of the magnetic layer 43 is the surface on which a magnetic head 56 included in the recording/reproduction device travels. The magnetic tape MT is preferably used in a recording/reproduction device including a ring-type head as a recording head.

(Base)

The base 41 is a non-magnetic support that supports the base layer 42 and the magnetic layer 43. The base 41 has a long film shape. The upper limit value of an average thickness of the base 41 is preferably 4.2 µm or less, more preferably 3.8 µm or less, and even more preferably 3.4 µm or less. In a case where the upper limit value of the average thickness of the base 41 is 4.2 µm or less, it is possible to increase a recording capacity that can be recorded in one data cartridge compared to a general magnetic tape. The lower limit value of the average thickness of the base 41 is preferably 3 µm or more, and more preferably 3.2 µm or more. In a case where the lower limit value of the average thickness of the base 41 is 3 µm or more, it is possible to suppress a decrease of strength of the base 41.

The average thickness of the base 41 is obtained as follows. First, prepare a ½ inch wide magnetic tape MT, cut it to a length of 250 mm, and prepare a sample. Subsequently, the layers other than the base 41 of the sample (that is, the base layer 42, the magnetic layer 43, and the back layer 44) are removed with a solvent such as a methyl ethyl ketone (MEK), dilute hydrochloric acid, or the like. Next, using a Laser Hologage (LGH-110C) manufactured by Mitutoyo Corporation as a measuring device, the thickness of the sample (the base 41) is measured at five or more points, and those measured values are simply averaged (arithmetic average) to calculate the average thickness of the base 41. Note that the measurement points shall be randomly selected from the sample.

The base 41 preferably contains polyester. Since the base 41 contains polyester, it is possible to reduce Young's modulus in the longitudinal direction of the base 41. Therefore, the width of the magnetic tape MT can be kept constant or substantially constant by adjusting the tension, by the recording/reproduction device, in the longitudinal direction of the magnetic tape MT when traveling.

Polyesters include, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bisphenoxycarboxylate. In a case where the base 41 contains two or more kinds of polyesters, the two or more kinds of polyesters may be mixed, copolymerized, or laminated. At least one of the end or side chains of the polyester may be modified.

It is possible to confirm that the base 41 contains polyester, for example, in the following manner. First, the layers other than the base 41 of the sample are removed in a similar manner as the method for measuring the average thickness of the base 41. Next, an IR spectrum of the sample (the base 41) is acquired by infrared absorption spectrometry (IR). Based on the IR spectrum, it is possible to confirm that the base 41 contains polyester.

In addition to polyester, the base 41 may further contain, for example, at least one of polyamide, polyimide, or polyamide-imide, or the base 41 may further contain at least one of polyamide, polyimide, polyamide-imide, polyolefins, cellulose derivatives, vinyl resins, or other polymer resins. The polyamide may be an aromatic polyamide (aramid). The polyimide may be an aromatic polyimide. The polyamide-imide may be an aromatic polyamide-imide.

In a case where the base 41 contains a polymer resin other than polyester, the base 41 preferably contains polyester as a main component. Here, the main component means the component having the highest content (a mass ratio) among the polymer resins contained in the base 41. In a case where the base 41 contains a polymer resin other than polyester, the polyester may be mixed with the polymer resin other than polyester or the polyester may be copolymerized with the polymer resin other than polyester.

The base 41 may be biaxially stretched in the longitudinal direction and the width direction. The polymer resin contained in the base 41 is preferably oriented obliquely with respect to the width direction of the base 41.

(Magnetic Layer)

The magnetic layer 43 is a perpendicular recording type recording layer for recording a signal by a magnetization pattern. The magnetic layer 43 contains, for example, a magnetic powder, a binder, and a lubricant. The magnetic layer 43 may further contain at least one additive among an antistatic agent, an abrasive, a curing agent, a rust preventive, non-magnetic reinforcing particles, and the like, if necessary.

An arithmetic average roughness Ra of the surface of the magnetic layer 43 is preferably 2.5 nm or less, more preferably 2.2 nm or less, and even more preferably 1.9 nm or less. In a case where the arithmetic average roughness Ra is 2.5 nm or less, it is possible to suppress a decrease of output due to the spacing loss, and it is possible to obtain excellent electromagnetic conversion characteristics. The lower limit value of the arithmetic average roughness Ra of the surface of the magnetic layer 43 is preferably 1.0 nm or more, more preferably 1.2 nm or more, and even more preferably 1.4 nm or more. In a case where the lower limit value of the arithmetic average roughness Ra of the surface of the magnetic layer 43 is 1.0 nm or more, it is possible to suppress a decrease in transportability due to an increase in friction.

The arithmetic average roughness Ra is obtained in the following manner. First, the surface of the magnetic layer 43 is observed with an atomic force microscope (AFM) to obtain an AFM image of 40 µm×40 µm. NanoScope Ma D3100 manufactured by Digital Instruments Inc. is used as the AFM, the cantilever including silicon single crystal is used (Note 1), and the tapping frequency is tuned to 200 to 400 Hz to perform the measurement. Next, the AFM image is divided into 512×512 (=262, 144) measurement points, and a height $Z(i)$ (i: measurement point number, i=1 to 262, 144) is measured at each measurement point. The measured height $Z(i)$ of each measurement point is simply averaged (arithmetic average), and an average height (average plane) $Zave$ $(=(Z(1)+Z(2)+\ldots+Z(262, 144))/262, 144)$ is obtained. Then, a deviation $Z''(i)$ $(=Z(i)-Zave)$ from an average center line at each measurement point is obtained, and the arithmetic average roughness Ra [nm] $(=(Z''(1)+Z''(2)+\ldots+Z''(262, 144))/262, 144)$ is calculated. In this case, as an image processing, data that has been filtered by Flatten Order 2 and Plane Fit Order 3 XY is used as data.

Figure 8:
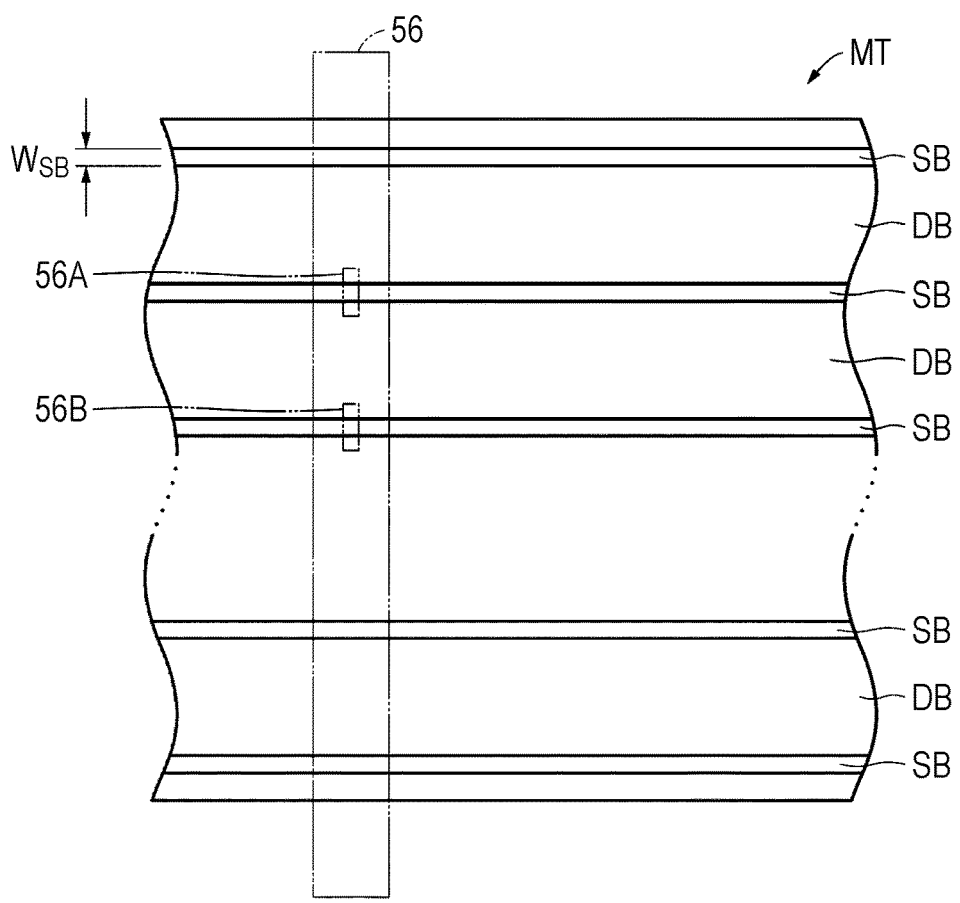
FIG. 8 is a schematic diagram illustrating an example of a layout of a data band and a servo band.

(Note 1) SPM probe NCH normal type Point Probe L (cantilever length)=125 µm manufactured by NanoWorld AG As illustrated in FIG. 8, the magnetic layer 43 may have a plurality of servo bands (servo tracks) SB and a plurality of data bands DB in advance. The plurality of servo bands SB is provided at an equal interval in the width direction of the magnetic tape MT. The data band DB is provided between adjacent servo bands SB. The servo band SB is for guiding the magnetic head 56 (specifically, servo read heads 56A and 56B) when recording or reproducing data. A servo pattern (a servo signal) for controlling a tracking of the magnetic head 56 is written in advance in the servo band SB. User data is recorded in the data band DB.

An upper limit value of a ratio $R_S$ of the total area SsB of the servo band SB to the surface area S of the magnetic layer 43 $(=(SsB/S)\times 100)$ is, from the viewpoint of ensuring high recording capacity, preferably 4.0% or less, more preferably 3.0% or less, and even more preferably 2.0% or less. On the other hand, a lower limit value of the ratio $R_S$ of the total area SsB of the servo band SB to the surface area S of the magnetic layer 43 is, from the viewpoint of ensuring five or more servo bands SB, preferably 0.8% or more.

The ratio $R_S$ of the total area SSB of the servo band SB to the area S of the entire surface of the magnetic layer 43 is obtained as follows. The magnetic tape MT is developed using a ferricolloid developer (Sigma High Chemical Co., Ltd., Sigmarker Q), and then the developed magnetic tape MT is observed with an optical microscope to measure a servo band width $W_{SB}$ and the number of servo bands SB. Next, the ratio $R_S$ is obtained from the following equation.

$$\text{Ratio } R_S \ [\%] = (((\text{Servo bandwidth } W_{SB}) \times (\text{Number of servo bands SB}))/(\text{Magnetic tape MT width})) \times 100$$

The number of servo bands SB is preferably five or more, and more preferably 5+4n (where n is a positive integer) or more. In a case where the number of servo bands SB is five or more, it is possible to suppress an influence on a servo signal due to a dimensional change in the width direction of the magnetic tape MT and to ensure stable recording/reproduction characteristics with less off-track. An upper limit value of the number of servo bands SB is not particularly limited, but is, for example, 33 or less.

The number of servo bands SB is obtained in a similar manner as the calculation method of the ratio $R_S$ described above.

An upper limit value of the servo bandwidth $W_{SB}$ is, from the viewpoint of ensuring a high recording capacity, preferably 95 μm or less, more preferably 60 μm or less, and even more preferably 30 μm or less. A lower limit value of the servo bandwidth $W_{SB}$ is preferably 10 μm or more. It is difficult to manufacture a magnetic head 56 capable of reading a servo signal with a servo bandwidth $W_{SB}$ fewer than 10 μm.

A width of the servo bandwidth $W_{SB}$ is obtained in a similar manner as the calculation method of the ratio $R_S$ described above.

Figure 9:
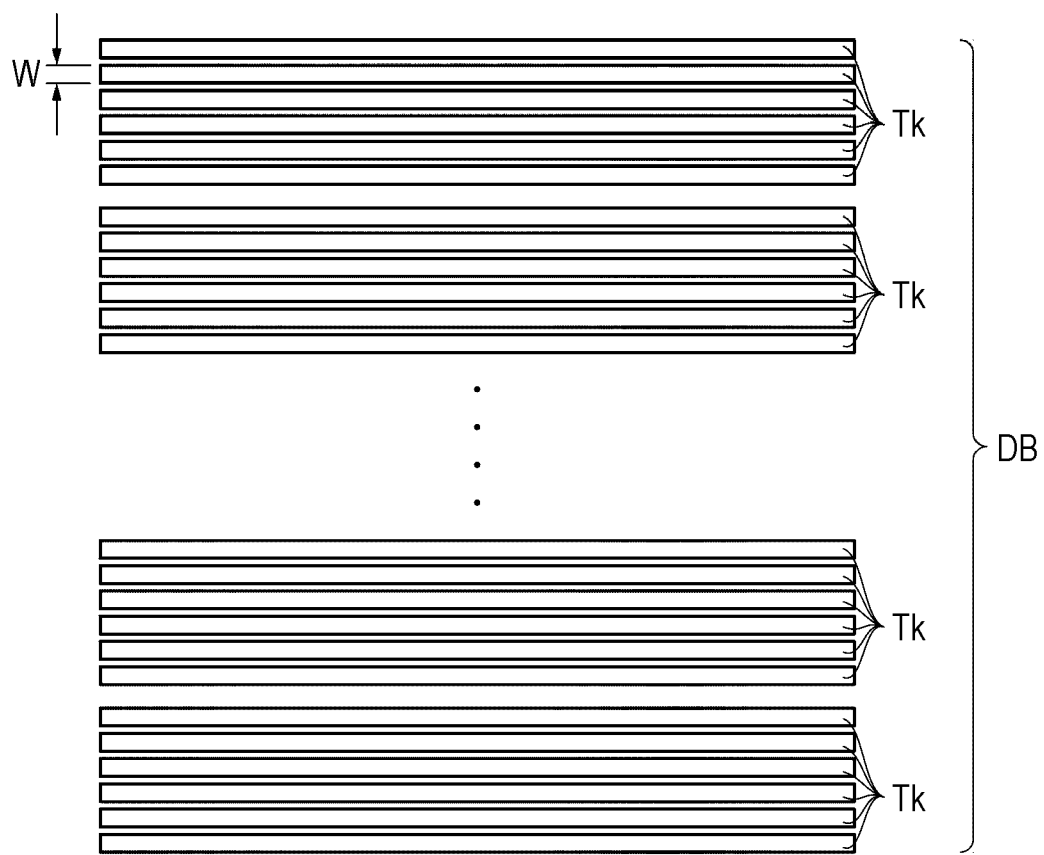
FIG. 9 is an enlarged view illustrating an example of a configuration of the data band.

As illustrated in FIG. 9, the magnetic layer 43 is configured so that a plurality of data tracks Tk can be formed in the data band DB. An upper limit value of the data track width W is, from the viewpoint of improving the track recording density and ensuring a high recording capacity, preferably 2000 nm or less, more preferably 1500 nm or less, and even more preferably 1000 nm. A lower limit value of the data track width W is preferably 20 nm or more in consideration of the size of a magnetic particle. From the viewpoint of ensuring a high recording capacity, the magnetic layer 43 is configured to be able to record data so that a minimum value of a distance between magnetization reversals L is preferably 48 nm or less, more preferably 44 nm or less, and even more preferably 40 nm or less. A lower limit value of the minimum value of the distance between magnetization reversals L is preferably 20 nm or more in consideration of the size of the magnetic particle.

The magnetic layer 43 is configured to be able to record data so that the minimum value of the distance between magnetization reversals L and the data track width W satisfy the condition preferably W/L≤35, more preferably W/L≤30, and even more preferably W/L≤25. In a case where the minimum value of the distance between magnetization reversals L is a constant value and the minimum value of the distance between magnetization reversals L and the track width W satisfy the condition W/L>35 (that is, in a case where the track width W is large), the track recording density does not become high, and there is a possibility that sufficient recording capacity may not be ensured. Also, in a case where the track width W is a constant value and the minimum value of the distance between magnetization reversals L and the track width W satisfy the condition W/L>35 (that is, in a case where the minimum value of the distance between magnetization reversals L is small), the bit length may become short and the line recording density may increase, but there is a possibility that the electromagnetic conversion characteristics (for example, signal-to-noise ratio (SNR)) may be significantly deteriorated due to an influence of spacing loss. Therefore, in order to suppress the deterioration of electromagnetic conversion characteristics (for example, SNR) while ensuring the recording capacity, it is preferable that W/L satisfies the range of W/L≤35, as described above, A lower limit value of W/L is not particularly limited, but is, for example, 1≤W/L.

The data track width W is obtained as follows. First, a data recording pattern of the data band DB portion of the magnetic layer 43 on which data is recorded on the entire surface is observed using a magnetic force microscope (MFM) to obtain an MFM image. As the MFM, Dimension 3100 manufactured by Digital Instruments and analysis software therefor are used. The measurement area of the MFM image is 10 μm×10 μm, and the measurement area of 10 μm×10 μm is divided into 512×512 (=262, 144) measurement points. Measurements are performed by the MFM on three 10 μm×10 μm measurement areas in different locations, that is, three MFM images are obtained. In the three obtained MFM images, the track widths at 10 points are measured using the analysis software bundled with Dimension 3100 to take the average value (simple average). The average value is the data track width W. Note that measurement conditions of the MFM described above are sweep speed: 1 Hz, used chip: MFMR-20, lift height: 20 nm, and correction: Flatten Order 3.

The minimum value of the distance between magnetization reversals L is obtained as follows. First, a data recording pattern of the data band DB portion of the magnetic layer 43 on which data is recorded on the entire surface is observed using a magnetic force microscope (MFM) to obtain an MFM image. As the MFM, Dimension 3100 manufactured by Digital Instruments and analysis software therefor are used. The measurement area of the MFM image is 2 μm×2 μm, and the measurement area of 2 μm×2 μm is divided into 512×512 (=262, 144) measurement points. Measurements are performed by the MFM on three 2 μm×2 μm measurement areas in different locations, that is, three MFM images are obtained. 50 distances between bits are measured from a two-dimensional unevenness chart of a recording pattern of the obtained MFM image. The measurement of the distance between bits is performed using the analysis software bundled with Dimension 3100. A value that corresponds to the near greatest common divisor of the measured 50 distances between bits shall be as the minimum value of the distance between magnetization reversals L. Note that measurement conditions are sweep speed: 1 Hz, used chip: MFMR-20, lift height: 20 nm, and correction: Flatten Order 3.

A servo pattern is a magnetization area, which is formed by magnetizing a specific area of the magnetic layer 43 in a specific direction by a servo write head at the time of manufacturing a magnetic tape. In the servo band SB, the area where the servo pattern is not formed (hereinafter referred to as "non-patterned area") may be a magnetized area in which the magnetic layer 43 is magnetized or a non-magnetized area in which the magnetic layer 43 is not magnetized. In a case where the non-patterned area is a magnetized area, the servo pattern formed area and the non-patterned area are magnetized in different directions (for example, in opposite directions).

Figure 10:
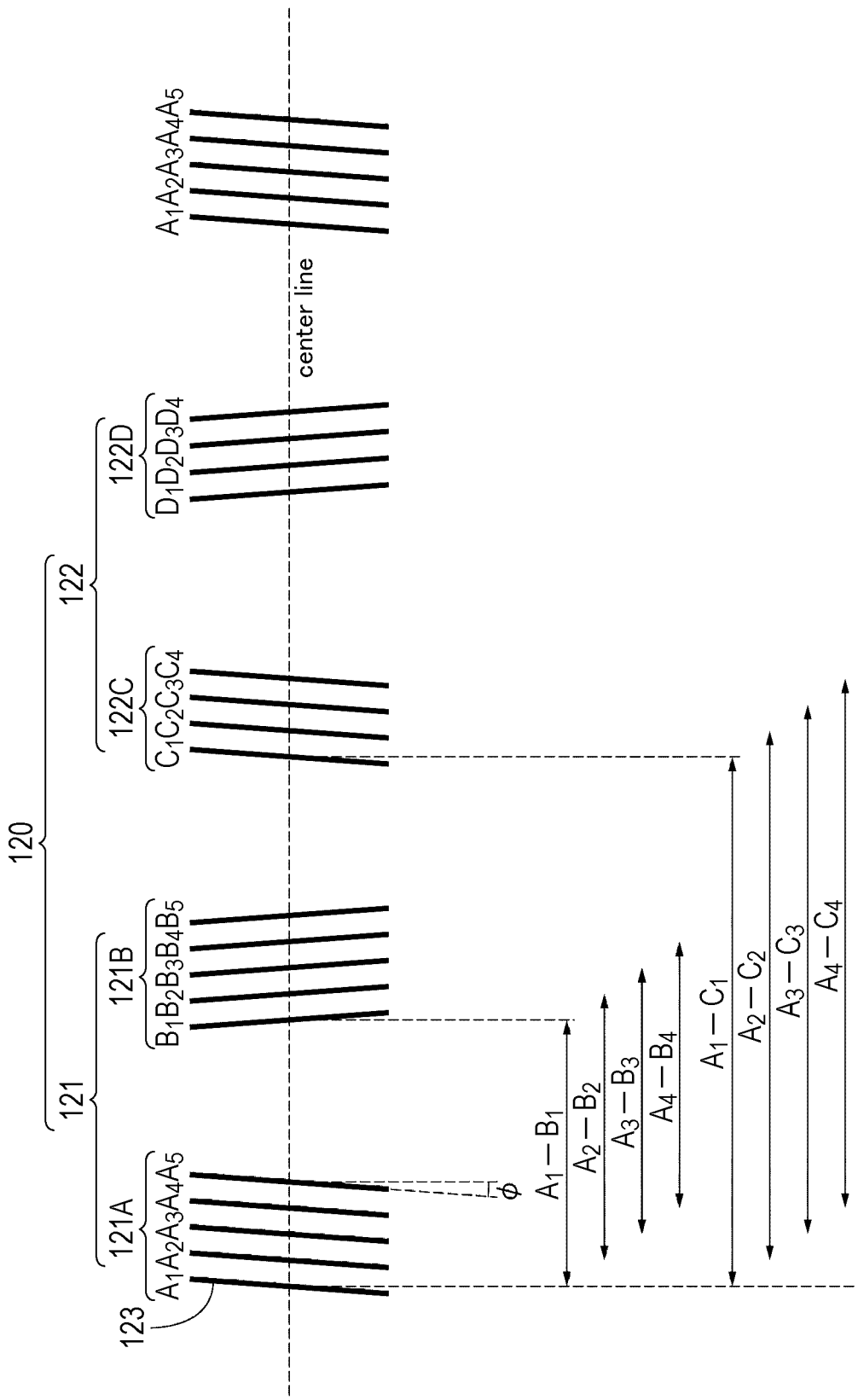
FIG. 10 is an enlarged view illustrating an example of a configuration of the servo band.

According to the LTO standard, as illustrated in FIG. 10, the servo band SB is formed with a servo pattern including a plurality of servo stripes (linear magnetized areas) 113 inclined with respect to the width direction of the magnetic tape MT.

The servo band SB includes a plurality of servo frames 120. Each servo frame 120 includes 18 servo stripes 123. Specifically, each servo frame 120 includes a servo subframe 1 (121) and a servo subframe 2 (122).

The servo subframe 1 (121) includes an A burst 121A and a B burst 121B. The B burst 121B is arranged adjacent to the A burst 121A. The A burst 121A includes five servo stripes 123 that are inclined at a predetermined angle φ with respect to the width direction of the magnetic tape MT and are formed at specified intervals. In FIG. 10, these five servo stripes 123 are illustrated by assigning signs $A_1$, $A_2$, $A_3$, $A_4$, and $A_5$ from end of tape (EOT) to beginning of tape (BOT) of the magnetic tape MT. Similarly to the A burst 121A, the B burst 121B includes five servo stripes 123 that are inclined at a predetermined angle φ with respect to the width direction of the magnetic tape MT and are formed at specified intervals. In FIG. 10, these five servo stripes 123 are illustrated by assigning signs $B_1$, $B_2$, $B_3$, $B_4$, and $B_5$ from EOT to BOT of the magnetic tape MT. The servo stripe 123 of the B burst 121B is inclined in the opposite direction to the servo stripe 123 of the A burst 121A. That is, the servo stripe 123 of the A burst 121A and the servo stripe 123 of the B burst 121B are arranged in a shape similar to an inverted V shape.

The servo subframe 2 (122) includes a C burst 122C and a D burst 122D. The D burst 122D is arranged adjacent to the C burst 122C. The C burst 122C includes four servo stripes 123 that are inclined at a predetermined angle φ with respect to the tape width direction and are formed at specified intervals. In FIG. 10, these four servo stripes 123 are illustrated by assigning signs $C_1$, $C_2$, $C_3$, and $C_4$ from EOT to BOT of the magnetic tape MT. Similarly to the C burst 122C, the D burst 122D includes four servo stripes 123 that are inclined at a predetermined angle φ with respect to the tape width direction and are formed at specified intervals. In FIG. 10, these four servo stripes 123 are illustrated by assigning signs $D_1$, $D_2$, $D_3$, and $D_4$ from EOT to BOT of the magnetic tape MT. The servo stripe 123 of the D burst 122D is inclined in the opposite direction to the servo stripe 123 of the C burst 122C. That is, the servo stripe 123 of the C burst 122C and the servo stripe 123 of the D burst 122D are arranged in a shape similar to an inverted V shape.

The predetermined angle φ described above of the servo stripe 123 in the A burst 121A, B burst 121B, C burst 122C, and D burst 122D is, for example, 5° to 25°, and can be 11° to 25° in particular.

By reading the servo band SB with the magnetic head 56, information for acquiring a tape speed and acquiring a vertical position of the magnetic head can be obtained. The tape speed is calculated from intervals between the four timing signals (A1-C1, A2-C2, A3-C3, and A4-C4). The head position is calculated from the intervals between the four timing signals described above and from intervals between the other four timing signals (A1-B1, A2-B2, A3-B3, and A4-B4).

As illustrated in FIG. 10, the servo patterns (that is, the plurality of servo stripes 123) are preferably arranged linearly in the longitudinal direction of the magnetic tape MT. That is, the servo band SB preferably has a linear shape in the longitudinal direction.

An upper limit value of an average thickness $t_m$ of the magnetic layer 43 is 80 nm or less, preferably 70 nm or less, and more preferably 50 nm or less. In a case where the upper limit value of the average thickness $t_m$ of the magnetic layer 43 is 80 nm or less, it is possible to reduce an influence of the demagnetizing field in a case where a ring-type head is used as the recording head, and it is possible to obtain excellent electromagnetic conversion characteristics.

A lower limit value of the average thickness $t_m$ of the magnetic layer 43 is preferably 35 nm or more. In a case where the lower limit value of the average thickness $t_m$ of the magnetic layer 43 is 35 nm or more, it is possible to ensure an output in a case where the MR type head is used as the reproducing head, and it is possible to obtain excellent electromagnetic conversion characteristics.

The average thickness $t_m$ of the magnetic layer 43 is obtained as follows. First, a carbon layer is formed on the surface on the magnetic layer 43 side and the surface on the back layer 44 side of the magnetic tape MT by a vapor deposition method, and then a tungsten layer is further formed on the surface on the magnetic layer 43 side by the vapor deposition method. These layers are formed to protect the sample in a flaking process described later. Next, the magnetic tape MT on which the layers described above are formed is processed by the focused ion beam (FIB) method to perform flaking. The flaking is performed along the length direction (the longitudinal direction) of the magnetic tape MT. That is, the flaking forms a cross section parallel to both the longitudinal direction and the thickness direction of the magnetic tape MT.

The cross section described above of the obtained flaking sample is observed with a transmission electron microscope (TEM) under the following conditions to obtain a TEM image. Note that the magnification and the acceleration voltage may be appropriately adjusted in accordance with the type of equipment.

Equipment: TEM (H9000NAR manufactured by Hitachi, Ltd.)
Acceleration voltage: 300 kV
Magnification: 100,000 times Next, using the obtained TEM image, the thickness of the magnetic layer 43 is measured at least 10 points or more in the longitudinal direction of the magnetic tape MT. The average value obtained by simply averaging the obtained measured values (arithmetic average) shall be as the average thickness $t_m$ [nm] of the magnetic layer 43. Note that the positions in which the measurements described above are performed shall be randomly selected from the test pieces.

(Magnetic Powder)

A magnetic powder contains a plurality of magnetic particles. The magnetic particles are, for example, particles containing hexagonal ferrite (hereinafter referred to as "hexagonal ferrite particles"), particles containing epsilon-type iron oxide (ε-iron oxide) (hereinafter referred to as "ε-iron oxide particles"), or particles containing Co-containing spinel ferrite (hereinafter referred to as "cobalt ferrite particles"). It is preferable that the magnetic powder is crystal-oriented preferentially in the thickness direction (the vertical direction) of the magnetic tape MT.

(Hexagonal Ferrite Particles)

The hexagonal ferrite particles have, for example, a hexagonal plate shape or a substantially hexagonal plate shape. The hexagonal ferrite preferably contains at least one of Ba, Sr, Pb, or Ca, and more preferably at least one of Ba or Sr. Specifically, the hexagonal ferrite may be, for example, barium ferrite or strontium ferrite. The barium ferrite may further contain at least one of Sr, Pb, or Ca in addition to Ba. The strontium ferrite may further contain at least one of Ba, Pb, or Ca in addition to Sr.

More specifically, hexagonal ferrite has an average composition represented by the general formula $MFe_{12}O_{19}$. Here, M is, for example, at least one metal among Ba, Sr, Pb, and Ca, preferably at least one metal between Ba and Sr. M may be a combination of Ba and one or more metals selected from a group consisting of Sr, Pb, and Ca. Also, M may be a combination of Sr and one or more metals selected from a group consisting of Ba, Pb, and Ca. In the general formula described above, a part of Fe may be replaced with another metal element.

(ε-Iron Oxide Particles)

The ε-iron oxide particles are hard magnetic particles capable of obtaining a high coercive force even with fine particles. The ε-iron oxide particles have a spherical or substantially spherical shape or have a cubic or substantially cubic shape. Since the ε-iron oxide particles have the shape described above, in a case where the ε-iron oxide particles are used as the magnetic particles, in comparison with a case where the hexagonal plate-shaped barium ferrite particles are used as the magnetic particles, it is possible to reduce the contact area between particles in the thickness direction of the magnetic tape MT and suppress the aggregation of particles. Therefore, the dispersiveness of the magnetic powder can be improved and excellent electromagnetic conversion characteristics (for example, SNR) can be obtained.

The ε-iron oxide particles have a core-shell type structure. Specifically, the ε-iron oxide particles include a core portion and a shell portion having a two-layer structure provided around the core portion. The shell portion having a two-layer structure includes a first shell portion provided on the core portion and a second shell portion provided on the first shell portion.

The core portion contains the ε-iron oxide. The ε-iron oxide contained in the core portion preferably has $\varepsilon\text{-}Fe_2O_3$ crystals as the main phase, and more preferably includes single-phase $\varepsilon\text{-}Fe_2O_3$.

The first shell portion covers at least a part of the circumference of the core portion. Specifically, the first shell portion may partially cover the circumference of the core portion or may cover the entire circumference of the core portion. From the viewpoint of making the exchange coupling between the core portion and the first shell portion sufficient and improving the magnetic characteristics, it is preferable to cover the entire surface of the core portion.

The first shell portion is a so-called soft magnetic layer and contains, for example, a soft magnetic material such as α-Fe, Ni—Fe alloy, Fe—Si—Al alloy, or the like. α-Fe may be obtained by reducing ε-iron oxide contained in the core portion.

The second shell portion is an oxide film as an antioxidant layer. The second shell portion contains α-iron oxide, aluminum oxide, or silicon oxide. α-Iron oxide contains, for example, at least one iron oxide of $Fe_3O_4$, $Fe_2O_3$, or FeO. In a case where the first shell portion contains α-Fe (a soft magnetic material), the α-iron oxide may be obtained by oxidizing α-Fe contained in the first shell portion.

Since the ε-iron oxide particles have the first shell portion as described above, while the coercive force Hc of the core portion alone is kept at a large value in order to ensure thermal stability, the coercive force Hc as the entire ε-iron oxide particles (core-shell particles) can be adjusted to the coercive force Hc suitable for recording. Also, since the ε-iron oxide particles have the second shell portion as described above, the ε-iron oxide particles are exposed to the air in the manufacturing process of the magnetic tape MT and before that process, and due to the occurrence of rust or the like on the particle surface, it is possible to suppress the deterioration of the characteristics of the ε-iron oxide particles. Therefore, it is possible to suppress deterioration of the characteristics of the magnetic tape MT.

The ε-iron oxide particles may include a shell portion having a single-layer structure. In this case, the shell portion has a similar configuration as the first shell portion. Here, from the viewpoint of suppressing deterioration of the characteristics of the ε-iron oxide particles, it is preferable that the ε-iron oxide particles include a shell portion having a two-layer structure, as described above.

The ε-iron oxide particles may contain an additive in place of the core-shell structure described above or may contain an additive along with having a core-shell structure. In this case, a part of Fe of the ε-iron oxide particles is replaced with the additive. Due to the thing that the ε-iron oxide particles contain the additive, since the coercive force Hc of the entire ε-iron oxide particles can be adjusted to the coercive force Hc suitable for recording, it is possible to improve the ease of recording. The additive is a metal element other than iron, preferably a trivalent metal element, more preferably at least one of Al, Ga, or In, and even more preferably at least one of Al or Ga.

Specifically, the ε-iron oxide containing the additive is an $\varepsilon\text{-}Fe_{2-x}M_xO_3$ crystal (where M is a metal element other than iron, preferably a trivalent metal element, more preferably at least one of Al, Ga, or In, and even more preferably at least one of Al or Ga, and x satisfies the condition, for example, 0<x<1).

(Cobalt Ferrite Particles)

The cobalt ferrite particles preferably have uniaxial crystal anisotropy. Since the cobalt ferrite particles have uniaxial crystal anisotropy, the magnetic powder can be preferentially crystal-oriented in the thickness direction (the vertical direction) of the magnetic tape MT. The cobalt ferrite particles have, for example, a cubic shape or a substantially cubic shape. The Co-containing spinel ferrite may further contain at least one of Ni, Mn, Al, Cu, or Zn in addition to Co.

The Co-containing spinel ferrite has, for example, an average composition represented by the following formula (1).

$$Co_xM_yFe_2O_z \qquad (1)$$

(However, in the formula (1), M is, for example, at least one metal of Ni, Mn, Al, Cu, or Zn. x is a value within the range of 0.4≤x≤1.0. y is a value within the range of 0≤y≤0.3. However, x and y satisfy the relationship of (x+y)≤1.0. z is a value within the range of 3≤z≤4. A part of Fe may be replaced with another metal element.)

(Binder)

Examples of the binder include thermoplastic resins, thermosetting resins, reactive resins, and the like. Examples of the thermoplastic resin include vinyl chloride, vinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylate-ethylene copolymer, polyvinyl fluoride, vinylidene chloride-acrylonitrile copolymer, acrylonitrile-butadiene copolymer, polyamide resin, polyvinyl butyral, cellulose derivative (cellulose acetate butyrate, cellulose diacetate, cellulose triacetate, cellulose propionate, nitrocellulose), styrene-butadiene copolymer, polyurethane resin, polyester resin, amino resin, synthetic rubber, and the like.

Examples of the thermosetting resin include phenol resin, epoxy resin, polyurethane curable resin, urea resin, melamine resin, alkyd resin, silicone resin, polyamine resin, urea-formaldehyde resin, and the like.

For all the binders described above, for the purpose of improving the dispersiveness of the magnetic powder, $-SO_3M$, $-OSO_3M$, $-COOM$, $P=O(OM)_2$ (where in the formula, M represents a hydrogen atom or an alkali metal such as lithium, potassium, sodium, and the like), a side-chain amine having a terminal group represented by $-NR1R2$, $-NR1R2R3^+X^-$, and a main-chain amine represented by $>NR1R2^+X^-$ (where in the formula, R1, R2, and R3 represent hydrogen atoms or hydrocarbon groups, $X^-$ represents halogen element ions such as fluorine, chlorine, bromine, iodine, and the like, inorganic ions, or organic ions), and furthermore a polar functional group such as $-OH$, $-SH$, $-CN$, an epoxy group, and the like may be introduced. The amount of these polar functional groups introduced into the binder is preferably $10^{-1}$ to $10^{-8}$ mol/g, and more preferably $10^{-2}$ to $10^{-6}$ mol/g.

(Lubricant)

Examples of the lubricant include esters of monobasic fatty acids having 10 to 24 carbon atoms and any of monohydric to hexahedral alcohols having 2 to 12 carbon atoms, mixed esters of monobasic fatty acids having 10 to 24 carbon atoms and monohydric to hexahedral alcohols having 2 to 12 carbon atoms, difatty acid esters, trifatty acid esters, and the like. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like.

(Antistatic Agent)

Examples of the antistatic agent include carbon black, natural surfactants, nonionic surfactants, cationic surfactants, and the like.

(Abrasive)

Examples of the abrasive include needle-shaped α-iron oxide obtained by dehydrating and annealing raw materials (α-alumina having a pregelatinization rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, or magnetic iron oxide), the raw materials described above whose surface is treated with at least one of aluminum or silica if necessary, and the like.

(Curing Agent)

Examples of the curing agent include polyisocyanate and the like. Examples of the polyisocyanate include aromatic polyisocyanates such as an adduct of tolylene diisocyanate (TDI) and an active hydrogen compound and the like, aliphatic polyisocyanates such as an adduct of hexamethylene diisocyanate (HMDI) and an active hydrogen compound and the like, and the like. The weight average molecular weight of these polyisocyanates is preferably in the range of 100 to 3000.

(Rust Preventive)

Examples of the rust preventive include phenols, naphthols, quinones, heterocyclic compounds containing a nitrogen atom, heterocyclic compounds containing an oxygen atom, heterocyclic compounds containing a sulfur atom, and the like.

(Non-Magnetic Reinforcing Particles)

Examples of the non-magnetic reinforcing particles include aluminum oxide (α, β, or γ alumina), chromium oxide, silicon oxide, diamond, garnet, emery, boron nitride, titanium carbide, silicon carbide, titanium carbide, titanium oxide (rutile-type or anatase-type titanium oxide), and the like.

(Base Layer)

The base layer 42 is for alleviating the unevenness of the surface of the base 41 and adjusting the unevenness of the surface of the magnetic layer 43. The base layer 42 is a non-magnetic layer containing a non-magnetic powder and the binder. The base layer 42 may further contain at least one additive among the lubricant, the antistatic agent, the curing agent, the rust preventive, and the like, if necessary.

The average thickness of the base layer 42 is preferably 0.3 μm or more and 2.0 μm or less, and more preferably 0.5 μm or more and 1.4 μm or less. Note that the average thickness of the base layer 42 is obtained in a similar manner as the average thickness of the magnetic layer 43. Here, the magnification of the TEM image is appropriately adjusted according to the thickness of the base layer 42. In a case where the average thickness of the base layer 42 is 2.0 μm or less, since the elasticity of the magnetic tape MT due to an external force gets further higher, it becomes further easier to adjust the width of the magnetic tape MT by adjusting the tension.

(Non-Magnetic Powder)

The non-magnetic powder contains, for example, at least one of an inorganic particle powder or an organic particle powder. Also, the non-magnetic powder may contain a carbon powder such as carbon black and the like. Note that one kind of non-magnetic powder may be used alone, or two or more kinds of non-magnetic powder may be used in combination. Inorganic particles include, for example, metals, metal oxides, metal carbonates, metal sulfates, metal nitrides, metal carbides, metal sulfides, and the like. Examples of the shape of the non-magnetic powder include, but are not limited to, various shapes such as a needle shape, a spherical shape, a cube shape, a plate shape, and the like.

(Binder)

The binder and the lubricant are similar to those of the magnetic layer 43 described above.

(Additive)

The lubricant, antistatic agent, curing agent, and rust preventive are respectively similar to those of the magnetic layer 43 described above.

(Back Layer)

The back layer 44 contains the binder and the non-magnetic powder. The back layer 44 may further contain at least one additive among the lubricant, the curing agent, an antistatic agent, and the like, if necessary. The binder and the non-magnetic powder are similar to those of the base layer 42 described above.

The average particle size of the non-magnetic powder is preferably 10 nm or more and 150 nm or less, and more preferably 15 nm or more and 110 nm or less. The average particle size of the non-magnetic powder is obtained in a similar manner as the average particle size of the magnetic powder described above. The non-magnetic powder may contain a non-magnetic powder having a particle size distribution of 2 or more.

The upper limit value of the average thickness of the back layer 44 is preferably 0.6 µm or less. In a case where the upper limit value of the average thickness of the back layer 44 is 0.6 µm or less, even in a case where the average thickness of the magnetic tape MT is 5.6 µm or less, it is possible to keep the thickness of the base layer 42 and the base 41 thick, so that It is possible to maintain running stability of the magnetic tape MT in the recording/reproduction device. The lower limit value of the average thickness of the back layer 44 is not particularly limited, but is, for example, 0.2 µm or more.

The average thickness $t_b$ of the back layer 44 is obtained as follows. First, the average thickness $t_T$ of the magnetic tape MT is measured. The method for measuring the average thickness $t_T$ is as described in the section "Average thickness of magnetic tape" below. Subsequently, the back layer 44 of the sample is removed with a solvent such as methyl ethyl ketone (MEK), dilute hydrochloric acid, or the like. Next, using the Laser Hologage (LGH-110C) manufactured by Mitutoyo Corporation, the thickness of the sample is measured at five or more points, and those measured values are simply averaged (arithmetic average) to calculate the average $t_B$ [µm]. Then, the average thickness $t_b$ [µm] of the back layer 44 is obtained from the following equation. Note that the measurement points shall be randomly selected from the sample.

$$t_b [\mu m] = t_T [\mu m] - t_B [\mu m]$$

(Average Thickness of Magnetic Tape)

The average thickness (average total thickness) $t_T$ of the magnetic tape MT is $t_T \leq 5.5$ [µm], preferably $t_T \leq 5.2$ [µm], more preferably $t_T \leq 5.0$ [µm], even more preferably $t_T \leq 4.6$ [µm], and particularly preferably $t_T 4.4$ [µm]. In a case where the average thickness $t_T$ of the magnetic tape MT is $t_T \leq 5.5$ [µm], the recording capacity that can be recorded in one data cartridge can be increased more than before. The lower limit value of the average thickness $t_T$ of the magnetic tape MT is not particularly limited, but is, for example, 3.5 [µm]$\leq t_T$.

The average thickness $t_T$ of the magnetic tape MT is obtained as follows. First, prepare a ½ inch wide magnetic tape MT, cut it to a length of 250 mm, and prepare a sample. Next, using the Laser Hologage (LGH-110C) manufactured by Mitutoyo Corporation as the measuring device, the thickness of the sample is measured at five or more points, and those measured values are simply averaged (arithmetic average) to calculate the average $t_T$ [µm]. Note that the measurement points shall be randomly selected from the sample.

(Coercive Force Hc)

The upper limit value of the coercive force Hc2 of the magnetic layer 43 in the longitudinal direction of the magnetic tape MT is preferably 2000 Oe or less, more preferably 1900 Oe or less, and even more preferably 1800 Oe or less. In a case where the coercive force Hc2 of the magnetic layer 43 in the longitudinal direction is 2000 Oe or less, it is possible to have sufficient electromagnetic conversion characteristics even at a high recording density.

The lower limit value of the coercive force Hc2 of the magnetic layer 43 measured in the longitudinal direction of the magnetic tape MT is preferably 1000 Oe or more. In a case where the coercive force Hc2 of the magnetic layer 43 measured in the longitudinal direction is 1000 Oe or more, it is possible to suppress demagnetization due to leakage flux from the recording head.

The coercive force Hc2 described above is obtained as follows. First, three of the magnetic tapes MT are laminated with a double-sided tape, and then punched out with a φ6.39 mm punch to prepare a measurement sample. At this time, marking is performed with an arbitrary non-magnetic ink so that it is possible to recognize the longitudinal direction (the traveling direction) of the magnetic tape. Then, the M-H loop of the measurement sample (the entire magnetic tape MT) corresponding to the longitudinal direction (the traveling direction) of the magnetic tape MT is measured using a vibrating sample magnetometer (VSM). Next, the coating film (the base layer 42, the magnetic layer 43, the back layer 44, and the like) is wiped off with acetone, ethanol, or the like, and only the base 41 is left. Then, three of the obtained bases 41 are laminated with a double-sided tape, and then punched out with the φ6.39 mm punch to prepare a sample for background correction (hereinafter, simply referred to as "sample for correction"). Then, the M-H loop of the sample for correction (the base 41) corresponding to the vertical direction of the base 41 (the vertical direction of the magnetic tape MT) is measured using the VSM.

In measuring the M-H loop of the measurement sample (the entire magnetic tape MT) and the M-H loop of the sample for correction (the base 41), a high-sensitivity vibration sample magnetometer "VSM-P7-15" manufactured by Toei Industry Co., Ltd. is used. The measurement conditions are, measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the whole magnetic tape MT) and the M-H loop of the sample for correction (the base 41) are obtained, by subtracting the M-H loop of the sample for correction (the base 41) from the M-H loop of the measurement sample (the whole magnetic tape MT), background correction is performed to obtain the background-corrected M-H loop. The measurement/analysis program bundled with "VSM-P7-15" is used to calculate the background correction described above. The coercive force Hc2 can be obtained from the obtained background-corrected M-H loop. Note that the measurement/analysis program bundled with the "VSM-P7-15" is used for the calculation described above. Note that all measurements of the M-H loop described above shall be performed at 25° C. Also, "demagnetizing field correction" shall not be performed when measuring the M-H loop in the longitudinal direction of the magnetic tape MT.

(Squareness Ratio)

A squareness ratio S1 of the magnetic layer 43 in the vertical direction (the thickness direction) of the magnetic tape MT is preferably 65% or more, more preferably 70% or more, even more preferably 75% or more, particularly preferably 80% or more, and most preferably Is over 85%. In a case where the squareness ratio S1 is 65% or more, since the vertical orientation of the magnetic powder becomes sufficiently high, it is possible to obtain excellent electromagnetic conversion characteristics (for example, SNR).

The squareness ratio S1 in the vertical direction is obtained as follows. First, three of the magnetic tapes MT are laminated with a double-sided tape, and then punched out with a φ6.39 mm punch to prepare a measurement sample. At this time, marking is performed with an arbitrary non-magnetic ink so that it is possible to recognize the longitudinal direction (the traveling direction) of the magnetic tape. Then, the M-H loop of the measurement sample (the entire magnetic tape MT) corresponding to the vertical direction (the thickness direction) of the magnetic tape MT is measured using the VSM. Next, the coating film (the base layer 42, the magnetic layer 43, the back layer 44, and the like) is wiped off with acetone, ethanol, or the like, and only the base 41 is left. Then, after three of the obtained bases 41 are laminated with a double-sided tape and punched out with a punch of φ6.39 mm to prepare a sample for background correction (hereinafter, simply referred to as "sample for correction"). Then, the M-H loop of the sample for correction (the base 41) corresponding to the vertical direction of the base 41 (the vertical direction of the magnetic tape MT) is measured using the VSM.

In measuring the M-H loop of the measurement sample (the entire magnetic tape MT) and the M-H loop of the sample for correction (the base 41), a high-sensitivity vibration sample magnetometer "VSM-P7-15" manufactured by Toei Industry Co., Ltd. is used. The measurement conditions are, measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the whole magnetic tape MT) and the M-H loop of the sample for correction (the base 41) are obtained, by subtracting the M-H loop of the sample for correction (the base 41) from the M-H loop of the measurement sample (the whole magnetic tape MT), background correction is performed to obtain the background-corrected M-H loop. The measurement/analysis program bundled with "VSM-P7-15" is used to calculate the background correction described above.

The saturated magnetization Ms (emu) and residual magnetization Mr (emu) of the obtained background-corrected M-H loop are substituted into the following equation to calculate the squareness ratio S1 (%). Note that all measurements of the M-H loop described above shall be performed at 25° C. Also, "demagnetizing field correction" shall not be performed when measuring the M-H loop in the vertical direction of the magnetic tape MT. Note that the measurement/analysis program bundled with the "VSM-P7-15" is used for the calculation described above.

Squareness ratio $S1(\%)=(Mr/Ms)\times100$

The squareness ratio S2 of the magnetic layer 43 in the longitudinal direction (the traveling direction) of the magnetic tape MT is preferably 35% or less, more preferably 30% or less, even more preferably 25% or less, particularly preferably 20% or less, and most preferably 15% or less. In a case where the squareness ratio S2 is 35% or less, since the vertical orientation of the magnetic powder becomes sufficiently high, it is possible to obtain excellent electromagnetic conversion characteristics (for example, SNR).

The squareness ratio S2 in the longitudinal direction is obtained in a similar manner as the squareness ratio S1 except for measuring the M-H loop in the longitudinal direction (the traveling direction) of the magnetic tape MT and the base 41.

(Hc2/Hc1)

A ratio Hc2/Hc1 of the coercive force Hc1 of the magnetic layer 43 in the vertical direction to the coercive force Hc2 of the magnetic layer 43 in the longitudinal direction satisfies the relationship of Hc2/Hc1≤0.8, preferably Hc2/Hc1≤0.75, more preferably Hc2/Hc1≤0.7, even more preferably Hc2/Hc1≤0.65, and particularly preferably Hc2/Hc1≤0.6. By the coercive forces Hc1 and Hc2 satisfy the relationship of Hc2/Hc1≤0.8, it is possible to increase the degree of the vertical orientation of the magnetic powder. Therefore, since it is possible to reduce the magnetization transition width and a high-output signal can be obtained when reproducing signal, it is possible to obtain excellent electromagnetic conversion characteristics (for example, SNR). Note that, as described above, in a case where Hc2 is small, since the magnetization reacts with high sensitivity by the magnetic field in the vertical direction from the recording head, it is possible to form a good recording pattern.

In a case where the ratio Hc2/Hc1 is Hc2/Hc1≤0.8, it is particularly effective that the average thickness of the magnetic layer 43 is 90 nm or less. If a case where the average thickness of the magnetic layer 43 exceeds 90 nm, in a case where a ring-type head is used as the recording head, the lower area of the magnetic layer 43 (the area on the base layer 42 side) is magnetized in the longitudinal direction and there is a possibility that the magnetic layer 43 may not be magnetized uniformly in the thickness direction. Therefore, even if the ratio Hc2/Hc1 is set to Hc2/Hc1≤0.8 (that is, even if the vertical orientation of the magnetic powder is increased), there is a possibility that excellent electromagnetic conversion characteristics (for example, SNR) may not be obtained.

The lower limit value of Hc2/Hc1 is not particularly limited, but is, for example, 0.5≤Hc2/Hc1. Note that Hc2/Hc1 represents the vertical orientation of the magnetic powder, and the smaller the Hc2/Hc1, the higher the vertical orientation of the magnetic powder.

The method of calculating the coercive force Hc2 of the magnetic layer 43 in the longitudinal direction is as described above. The coercive force Hc1 of the magnetic layer 43 in the vertical direction is obtained in a similar manner as the coercive force Hc2 of the magnetic layer 43 in the longitudinal direction except for measuring the M-H loop in the vertical direction (the thickness direction) of the magnetic tape MT and the base 41.

(Surface Roughness $R_b$ on Back Surface)

The surface roughness of a back surface (the surface roughness of the back layer 44) $R_b$ is preferably $R_b \leq 6.0$ [nm]. In a case where the surface roughness $R_b$ of the back surface is in the range described above, it is possible to obtain excellent electromagnetic conversion characteristics.

The surface roughness $R_b$ of the back surface is obtained as follows. First, prepare a ½ inch wide magnetic tape MT and attach it to a slide glass with its back surface facing up to make a test piece. Next, the surface roughness of the back surface of the test piece is measured by a non-contact roughness meter using the optical interference described below.

Equipment: Non-contact roughness meter using optical interference (Non-contact surface/layer cross-sectional shape measurement system VertScan R5500GL-M100-AC manufactured by Ryoka Systems Inc.)

Objective lens: 20× (approx. 237 μm×178 μm field of view)

Resolution: 640 points×480 points

Measurement mode: Phase

Wavelength filter: 520 nm

Surface correction: Correction with a quadratic polynomial approximation surface As described above, after measuring the surface roughness in at least five points in the longitudinal direction, the average of each arithmetic average roughness Sa (nm) automatically calculated from the surface profile obtained at each position shall be the surface roughness $R_b$ (nm) of the back surface.

(Young's Modulus in the Longitudinal Direction of Magnetic Tape)

Young's modulus in the longitudinal direction of the magnetic tape MT is preferably 8.0 GPa or less, more preferably 7.9 GPa or less, even more preferably 7.5 GPa or less, and particularly preferably 7.1 GPa or less. In a case where Young's modulus in the longitudinal direction of the magnetic tape MT is 8.0 GPa or less, since the elasticity of the magnetic tape MT due to an external force gets further higher, it becomes further easier to adjust the width of the magnetic tape MT by adjusting the tension. Therefore, it is possible to suppress off-track further appropriately, and it is possible to reproduce the data recorded on the magnetic tape MT further accurately.

Young's modulus in the longitudinal direction of the magnetic tape MT is a value indicating the difficulty of expanding and contracting the magnetic tape MT in the longitudinal direction due to an external force. The larger this value is, the more difficult it is for the magnetic tape MT to expand and contract in the longitudinal direction due to an external force. The smaller this value is, the easier it is for the magnetic tape MT to expand and contract in the longitudinal direction due to an external force.

Note that, Young's modulus in the longitudinal direction of the magnetic tape MT is a value related to the longitudinal direction of the magnetic tape MT, and the value also correlates with the difficulty of expansion and contraction in the width direction of the magnetic tape MT. That is, the larger this value is, the more difficult it is for the magnetic tape MT to expand and contract in the width direction due to an external force, and the smaller this value is, the easier it is for the magnetic tape MT to expand and contract in the width direction due to an external force. Therefore, from the viewpoint of adjusting tension, it is advantageous that Young's modulus in the longitudinal direction of the magnetic tape MT is small.

Young's modulus is measured using a tensile tester (manufactured by Shimadzu Corporation, AG-100D). In case of wanting to measure Young's modulus in the longitudinal direction of the tape, the tape is cut to a length of 180 mm to prepare a measurement sample. A jig that can fix the width of the tape (½ inches) is attached to the tensile tester described above to fix the top and bottom of the tape width. The distance (tape length between chucks) shall be 100 mm. After chucking the tape sample, stress is gradually applied in the direction of pulling the sample. The pulling speed shall be 0.1 mm/min. From the change in stress and the amount of elongation at this time, Young's modulus is calculated using the following equation.

$$E(N/m^2) = ((\Delta N/S)/(\Delta x/L)) \times 10^6$$

ΔN: Change in stress (N)
S: Cross-sectional area of test piece (mm$^2$)
Δx: Amount of elongation (mm)
L: Distance between grip jigs (mm)

The range of stress is 0.5 N to 1.0 N, and the stress change (ΔN) and the amount of elongation (Δx) at this time are used in the calculation.

(Young's Modulus in the Longitudinal Direction of the Base)

The Young's modulus in the longitudinal direction of the base 41 is preferably 7.5 GPa or less, more preferably 7.4 GPa or less, even more preferably 7.0 GPa or less, and particularly preferably 6.6 GPa or less. In a case where Young's modulus in the longitudinal direction of the base 41 is 7.5 GPa or less, since the elasticity of the magnetic tape MT due to an external force gets further higher, it becomes further easier to adjust the width of the magnetic tape MT by adjusting the tension. Therefore, it is possible to suppress off-track further appropriately, and it is possible to reproduce the data recorded on the magnetic tape MT further accurately.

Young's modulus in the longitudinal direction of the base 41 described above is obtained in the following manner. First, the base layer 42, the magnetic layer 43, and the back layer 44 are removed from the magnetic tape MT to obtain the base 41. Using this base 41, Young's modulus in the longitudinal direction of the base 41 is obtained by a similar procedure as Young's modulus in the longitudinal direction of the magnetic tape MT described above.

The thickness of the base 41 accounts for more than half of the total thickness of the magnetic tape MT. Therefore, Young's modulus in the longitudinal direction of the base 41 correlates with the difficulty of expanding and contracting the magnetic tape MT due to an external force. The larger this value is, the more difficult it is for the magnetic tape MT to expand and contract in the width direction due to an external force. The smaller this value is, the easier it is for the magnetic tape MT to expand and contract in the width direction due to an external force.

Note that, Young's modulus in the longitudinal direction of the base 41 is a value related to the longitudinal direction of the magnetic tape MT, and the value also correlates with the difficulty of expansion and contraction in the width direction of the magnetic tape MT. That is, the larger this value is, the more difficult it is for the magnetic tape MT to expand and contract in the width direction due to an external force, and the smaller this value is, the easier it is for the magnetic tape MT to expand and contract in the width direction due to an external force. Therefore, from the viewpoint of adjusting tension, it is advantageous that Young's modulus in the longitudinal direction of the base 41 is small.

(Amount of Dimensional Change Δw)

The amount of dimensional change Δw [ppm/N] in the width direction of the magnetic tape MT with respect to the tension change in the longitudinal direction of the magnetic tape MT is preferably 650 ppm/N≤Δw, more preferably 670 ppm/N≤Δw, even more preferably 700 ppm/N≤Δw, particularly preferably 750 ppm/N≤Δw, and most preferably 800 ppm/N≤Δw. In a case where the amount of dimensional change Δw is Δw<650 ppm/N, there is a possibility that it may be difficult to suppress the change in the width of the magnetic tape MT by adjusting the tension in the longitudinal direction of the magnetic tape MT by the recording/reproduction device. The upper limit value of the amount of dimensional change Δw is not particularly limited, but is, for example, Δw≤1700000 ppm/N, preferably Δw≤20000 ppm/N, more preferably Δw≤8000 ppm/N, and even more preferably Δw≤5000 ppm/N, Δw≤4000 ppm/N, Δw≤3000 ppm/N, or Δw≤2000 ppm/N.

The amount of dimensional change Δw can be set to a desired value by selecting the base 41. For example, it is possible to set the amount of dimensional change Δw to the desired value by selecting at least one of the thickness of the base 41 or the material of the base 41. Also, the amount of dimensional change Δw may be set to the desired value by, for example, adjusting the stretching strength in the width direction and the longitudinal direction of the base 41. For example, by stretching the base 41 more strongly in the width direction, the amount of dimensional change Δw further drops, and conversely, by strengthening the stretching of the base 41 in the longitudinal direction, the amount of dimensional change Δw rises.

The amount of dimensional change Δw can be obtained as follows. First, prepare a ½ inch wide magnetic tape MT, cut it to a length of 250 mm, and prepare a sample 10S. Next, load in the longitudinal direction is applied to the sample 10S in the order of 0.2 N, 0.6 N, and 1.0 N to measure the width of the sample 10S under loads of 0.2 N, 0.6 N, and 1.0 N. Subsequently, the amount of dimensional change Δw is obtained from the following equation. Note that the measurement in a case where the load of 0.6 N is applied is performed to confirm that no abnormality has occurred in the measurement (especially to confirm that these three measurement results are linear), and that measurement result is not used in the following equation.

$$\Delta w[ppm/N] = \frac{D(0.2\ N)[mm] - D(1.0\ N)[mm]}{D(0.2\ N)[mm]} \times \frac{1,000,000}{(1.0[N]) - (0.2[N])} \quad \text{[Equation 1]}$$

(Here, in the equation, D (0.2 N) and D (1.0 N) indicate the width of the sample 10S in a case where a load of 0.2 N and 1.0 N is applied in the longitudinal direction of the sample 10S, respectively.)

Figure 11:
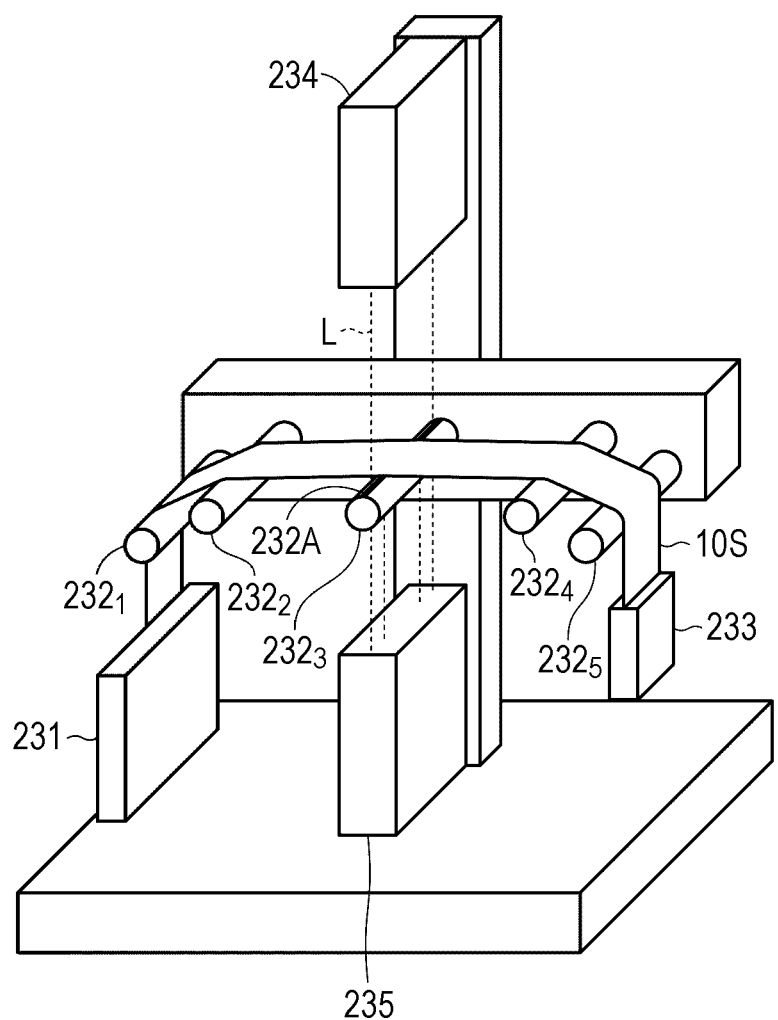
FIG. 11 is a perspective view illustrating a configuration of a measuring device.

The width of the sample 10S when applying each load is measured as follows. First, a measuring device illustrated in FIG. 11 incorporating a digital dimension measuring instrument LS-7000 manufactured by KEYENCE CORPORATION is prepared as a measuring device, and the sample 10S is set in this measuring device. Specifically, one end of the sample 10S (the magnetic tape MT) being a long shape is fixed by a fixing portion 231. Next, as illustrated in FIG. 11, the sample 10S is placed on five substantially columnar and rod-shaped support members $232_1$ to $232_5$. The sample 10S is placed on these support members $232_1$ to $232_5$ so that its back surface is in contact with the five support members $232_1$ to $232_5$. The five support members $232_1$ to $232_5$ (particularly their surfaces) all include stainless steel SUS304, and their surface roughness Rz (maximum height) is 0.15 μm to 0.3 μm.

The arrangement of the five rod-shaped support members $232_1$ to $232_5$ will be described with reference to FIG. 11. As illustrated in FIG. 11, the sample 10S is placed on five support members $232_1$ to $232_5$. Regarding the five support members $232_1$ to $232_5$, hereinafter, from the side closest to the fixing portion 231, they are referred to as "first support member $232_1$", "second support member $232_2$", "third support member $232_3$" (having a slit 232A), "fourth support member $232_4$", and "fifth support member $232_5$" (closest to a weight 233). The diameters of these five support members, the first support member $232_1$ to the fifth support member $232_5$, are all 7 mm. The distance d1 (particularly the distance between the central axes of these support members) between the first support member $232_1$ and the second support member $232_2$ is 20 mm. The distance d2 between the second support member $232_2$ and the third support member $232_3$ is 30 mm. The distance d3 between the third support member $232_3$ and the fourth support member $232_4$ is 30 mm. The distance d4 between the fourth support member $232_4$ and the fifth support member $232_5$ is 20 mm.

Also, these three support members $232_2$ to $232_4$ are arranged so that, in the sample 10S, the portion of the sample 10S that sits between the second support member $232_2$, the third support member $232_3$, and the fourth support member $232_4$ forms a plane substantially perpendicular to the direction of gravity. Also, the first support member $232_1$ and the second support member $232_2$ are arranged so that the sample 10S forms an angle of $\theta 1 = 30°$ with respect to the substantially vertical plane described above between the first support member $232_1$ and the second support member $232_2$. Further, the fourth support member $232_4$ and the fifth support member $232_5$ are arranged so that the sample 10S forms an angle of $\theta 2 = 30°$ with respect to the substantially vertical plane described above between the fourth support member $232_4$ and the fifth support member $232_5$. Also, among the five first support member $232_1$ to fifth support member $232_5$, the third support member $232_3$ is fixed so as not to rotate, but the other four support members, the first support member $232_1$, the second support member $232_2$, the fourth support member $232_4$, and the fifth support member $232_5$, are all rotatable.

The sample 10S is held on the support members $232_1$ to $232_5$ so as not to move in the width direction of the sample 10S. Note that, among the support members $232_1$ to $232_5$, the support member $232_3$ located between the light emitter 234 and the light receiver 235 and located substantially at the center of the fixing portion 231 and the portion to which the load is applied is provided with a slit 232A. Light L is emitted from the light emitter 234 to the light receiver 235 via the slit 232A. The slit width of the slit 232A is 1 mm, and the light L can pass through the slit 232A without being blocked by the frame of the slit 232A.

Subsequently, after the measuring device is housed in a chamber controlled under a constant environment with a temperature of 25° C. and relative humidity of 50%, a weight 233 for applying a load of 0.2 N is attached to the other end of the sample 10S, and the sample 10S is placed in the environment described above for two hours. After two hours elapse, measure the width of the sample 10S. Next, the weight for applying the load of 0.2 N is changed to a weight for applying a load of 0.6 N, and the width of the sample 10S is measured five minutes after the change. Finally, change to a weight for applying a load of 1.0 N, and measure the width of the sample 10S five minutes after the change.

As described above, the load applied in the longitudinal direction of the sample 10S can be changed by adjusting the weight of the weight 233. With each load applied, the light L is emitted from the light emitter 234 toward the light receiver 235, and the width of the sample 10S to which the load is applied in the longitudinal direction is measured. The width measurement is performed with the sample 10S uncurled. The light emitter 234 and the light receiver 235 are provided in the digital dimension measuring instrument LS-7000.

(Coefficient of Thermal Expansion α)

The coefficient of thermal expansion a of the magnetic tape MT is preferably 6 [ppm/° C.]≤α≤8[ppm/° C.]. In a case where the coefficient of thermal expansion a is in the range described above, it is possible to further suppress the change in the width of the magnetic tape MT by adjusting the tension in the longitudinal direction of the magnetic tape MT by the recording/reproduction device.

The coefficient of thermal expansion α is obtained as follows. First, the sample 10S is prepared in a similar manner as the method for measuring the amount of dimensional change Δw, and after setting the sample 10S in a measuring device similar to the measuring device used in the method for measuring the amount of dimensional change Δw, the measuring device is housed in a chamber controlled in a constant environment with a temperature of 29° C. and relative humidity of 24%. Next, load of 0.2 N is applied to the sample 10S in the longitudinal direction and the sample 10S is adapted to the environment described above. Then, while maintaining the relative humidity of 24%, change the temperature in the order of 45° C., 29° C., and 10° C., measure the width of the sample 10S at 45° C. and 10° C., and measure the temperature from the following equation to obtain the coefficient of thermal expansion a. Note that the measurement of the width of the sample 10S at the temperature of 29° C. is performed to confirm that no abnormality has occurred in the measurement (especially to confirm that these three measurement results are linear), and that measurement result is not used in the following equation.

$$\alpha[ppm/°C.] = \frac{D(45°C.)[mm] - D(10°C.)[mm]}{D(10°C.)[mm]} \times \frac{1,000,000}{(45[°C.] - (10[°C.]))} \quad \text{[Equation 2]}$$

(Here, in the equation, D (45° C.) and D (10° C.) indicate the width of the sample 10S at temperatures of 45° C. and 10° C., respectively.)

(Coefficient of Humidity Expansion β)

The coefficient of humidity expansion β of the magnetic tape MT is preferably β≤5 [ppm/% RH]. In a case where the coefficient of humidity expansion β is in the range described above, it is possible to further suppress the change in the width of the magnetic tape MT by adjusting the tension in the longitudinal direction of the magnetic tape MT by the recording/reproduction device.

The coefficient of humidity expansion β is obtained as follows. First, the sample 10S is prepared in a similar manner as the method for measuring the amount of dimensional change Δw, and after setting the sample 10S in a measuring device similar to the measuring device used in the method for measuring the amount of dimensional change Δw, the measuring device is housed in a chamber controlled in a constant environment with a temperature of 29° C. and relative humidity of 24%. Next, load of 0.2 N is applied to the sample 10S in the longitudinal direction and the sample 10S is adapted to the environment described above. Then, while maintaining the temperature of 29° C., change the relative humidity in the order of 80%, 24%, and 10%, measure the width of the sample 10S at 80% and 10%, and obtain the coefficient of humidity expansion β from the following equation. Note that the measurement of the width of the sample 10S at the humidity of 24% is performed to confirm that no abnormality has occurred in the measurement (especially to confirm that these three measurement results are linear), and that measurement result is not used in the following equation.

$$\beta[ppm/\%RH] = \frac{D(80\%)[mm] - D(10\%)[mm]}{D(10\%)[mm]} \times \frac{1,000,000}{(80[\%] - (10[\%]))} \quad \text{[Equation 3]}$$

(Here, in the equation, D (80%) and D (10%) indicate the width of the sample 10S at the humidity of 80% and 10%, respectively.)

(Poisson's Ratio ρ)

Poisson's ratio ρ of the magnetic tape MT is preferably 0.3≤ρ. In a case where Poisson's ratio ρ is in the range described above, it is possible to further suppress the change in the width of the magnetic tape MT by adjusting the tension in the longitudinal direction of the magnetic tape MT by the recording/reproduction device.

Poisson's ratio ρ can be obtained as follows. First, a ½ inch wide magnetic tape MT is prepared, cut it to a length of 150 mm to prepare a sample, and then a mark having a size of 6 mm×6 mm is given to the center of the sample. Next, chuck both ends of the sample in the longitudinal direction so that the distance between the chucks is 100 mm, apply an initial load of 2 N, set the length of the mark in the longitudinal direction of the sample on that occasion as the initial length, and the width of the mark in the width direction of the sample shall be the initial width. Then, at a tensile speed of 0.5 mm/min, pull with an Instron-type universal tensile tester, and with an image sensor manufactured by KEYENCE CORPORATION, measure the amount of dimensional change in each of the length of the mark in the longitudinal direction of the sample and the width of the mark in the width direction of the sample. Then, Poisson's ratio ρ is obtained from the following equation.

$$\rho = \frac{\left\{\frac{(\text{Amount of dimensional change in width of mark[mm]})}{(\text{Initial width [mm]})}\right\}}{\left\{\frac{(\text{Amount of dimensional change in length of mark[mm]})}{(\text{Initial length[mm]})}\right\}} \quad \text{[Equation 4]}$$

(Elastic Limit Value $\sigma_{MD}$ in the Longitudinal Direction)

The elastic limit value $\sigma_{MD}$ in the longitudinal direction of the magnetic tape MT is preferably 0.8 [N]≤$\sigma_{MD}$. In a case where the elastic limit value $\sigma_{MD}$ is in the range described above, it is possible to further suppress the change in the width of the magnetic tape MT by adjusting the tension in the longitudinal direction of the magnetic tape MT by the recording/reproduction device. Also, it becomes easier to control the drive side. The upper limit value of the elastic limit value $\sigma_{MD}$ in the longitudinal direction of the magnetic tape MT is not particularly limited, but is, for example, $\sigma_{MD}$≤5.0[N]. It is preferable that the elastic limit value $\sigma_{MD}$ does not depend on the tensile speed V when measuring the elastic limit. By the elastic limit value σMD does not depend on the tensile speed V described above, without being affected by the traveling speed of the magnetic tape MT in the recording/reproduction device and being affected by the tension adjustment speed and its responsiveness of the recording/reproduction device, the reason why is that it is possible to suppress the change in the width of the magnetic tape MT effectively. The elastic limit value $\sigma_{MD}$ is set to the desired value by, for example, selecting the curing conditions of the base layer 42, the magnetic layer 43, and the back layer 44, and selecting the material of the base 41. For example, the longer the curing time of paint for forming the base layer, paint for forming the recording layer, and paint for forming the back layer, or the higher the curing temperature, the more the reaction between the binder contained in each of these paints and the curing agent accelerates. Therefore, the elastic characteristics are improved, and the elastic limit value $\sigma_{MD}$ is improved.

The elastic limit value $\sigma_{MD}$ is obtained as follows. First, prepare a ½ inch wide magnetic tape MT, cut it to a length of 150 mm to prepare a sample, and chuck both ends in the longitudinal direction of the sample to a universal tensile test device so that the distance between chucks $\lambda_0$ is $\lambda_0$=100 mm. Next, the sample is pulled at a tensile speed of 0.5 mm/min, and the load σ (N) with respect to the distance between chucks λ (mm) is continuously measured. Then, using the obtained data of λ (mm) and σ (N), the relationship between Δλ (%) and σ (N) is graphed. Here, Δλ (%) is given by the following equation.

$$\Delta\lambda(\%) = ((\lambda - \lambda_0)/\lambda_0) \times 100$$

Next, in the graph described above, in the area where σ≥0.2 N, the area where the graph becomes a straight line is calculated, and the maximum load σ shall be the elastic limit value $\sigma_{MD}$ (N).

[1.5 Configuration of Information Terminal]

Figure 4:
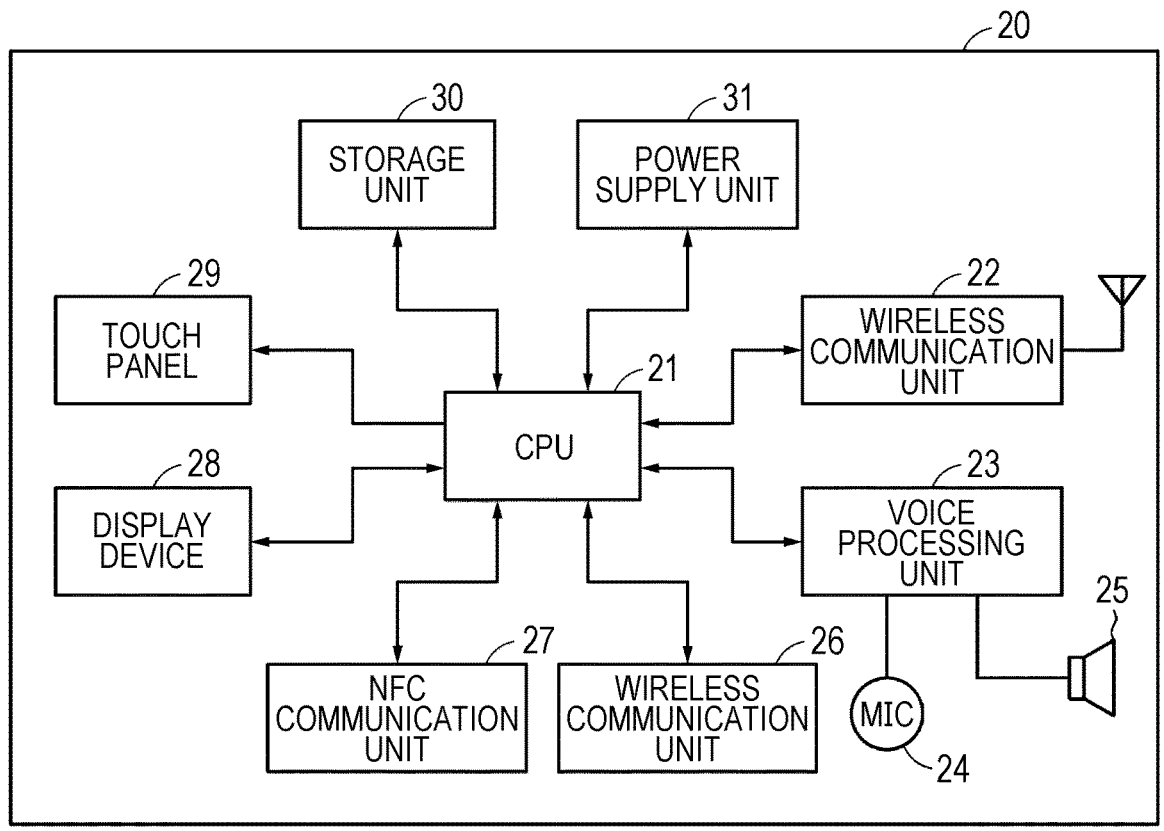
FIG. 4 is a block diagram illustrating an example of a configuration of an information terminal.

FIG. 4 illustrates an example of a configuration of the information terminal 20. The information terminal 20 is a so-called smartphone and includes a central processing unit (CPU) 21, a wireless communication unit 22, a voice processing unit 23, a microphone 24, a speaker 25, a wireless communication unit 26, an NFC communication unit 27, a display device 28, a touch panel 29, a storage unit 30, and a power supply unit 31. Here, a case where the information terminal 20 is a smartphone will be described, but the information terminal 20 is not limited to the case and may be a laptop computer, a tablet computer, or the like.

The wireless communication unit 22 performs wireless communication via a base station according to, for example, the Long Term Evolution (LTE)-Advanced standard or the Wireless MAN-Advanced (WiMAX 2) standard. For example, data related to the tape cartridge 10 (hereinafter, accordingly referred to as "tape-related data") is transmitted to or received from the cloud server.

The microphone 24 and the speaker 25 are connected to the voice processing unit 23, and the voice processing unit 23 processes a call with a counterparty connected by wireless communication in the wireless communication unit 22.

The wireless communication unit 26 performs short-range wireless communication with an electronic device such as another information terminal and the like using, for example, the Wi-Fi (registered trademark) standard or the Bluetooth (registered trademark) standard.

The NFC communication unit 27 performs short-range wireless communication with an electronic device such as the CM 11 of the tape cartridge 10 nearby, another information terminal, or the like according to the NFC standard (the second communication standard).

The display device 28 displays various screens on the basis of a video signal and the like supplied from the CPU 21. Also, the tape-related data read from the CM 11 via the NFC communication unit 27 and the tape-related data received from the cloud server or database via the wireless communication unit 22 are displayed. Examples of the display device 28 include, but are not limited to, a liquid crystal display, an electroluminescence (EL) display, and the like.

The touch panel 29 is provided on the surface of the display device 28. The touch panel 29 is a so-called capacitance type touch panel and supplies a signal corresponding to a touch operation to the display surface of the display device 28 to the CPU 21.

The storage unit 30 is a random access memory (RAM) and the like and stores an operating system (OS) and an application. Applications include those capable of performing, for example, various operations such as reading the tape-related data from the CM 11, displaying the read tape-related data, uploading the read tape-related data to the cloud server or database, and the like, and those capable of performing a health check and the like of the tape cartridge 11 based on the read tape-related data. The storage unit 30 stores various data such as the tape-related data read from the CM 11, tape-related data received from the cloud server, and the like.

The power supply unit 31 supplies electric power to each unit provided in the information terminal 20. The power supply unit 31 includes a secondary battery such as a lithium-ion secondary battery and the like, a charge/discharge control circuit for controlling charging/discharging of the secondary battery, and the like.

The CPU 21 is a control unit that controls each unit of the information terminal 20. The CPU 21 executes various processes on the basis of the signal supplied from the touch panel 29. Also, the CPU 21 stores the data acquired via the wireless communication unit 22, the wireless communication unit 26, the NFC communication unit 27, and the like in the storage unit 30. For example, the CPU 21 controls the NFC communication unit 27, reads the tape-related data from the CM 11, and stores the read tape-related data in the storage unit 30 as needed.

[1.6 Operation of Data Management System]

Figure 5:
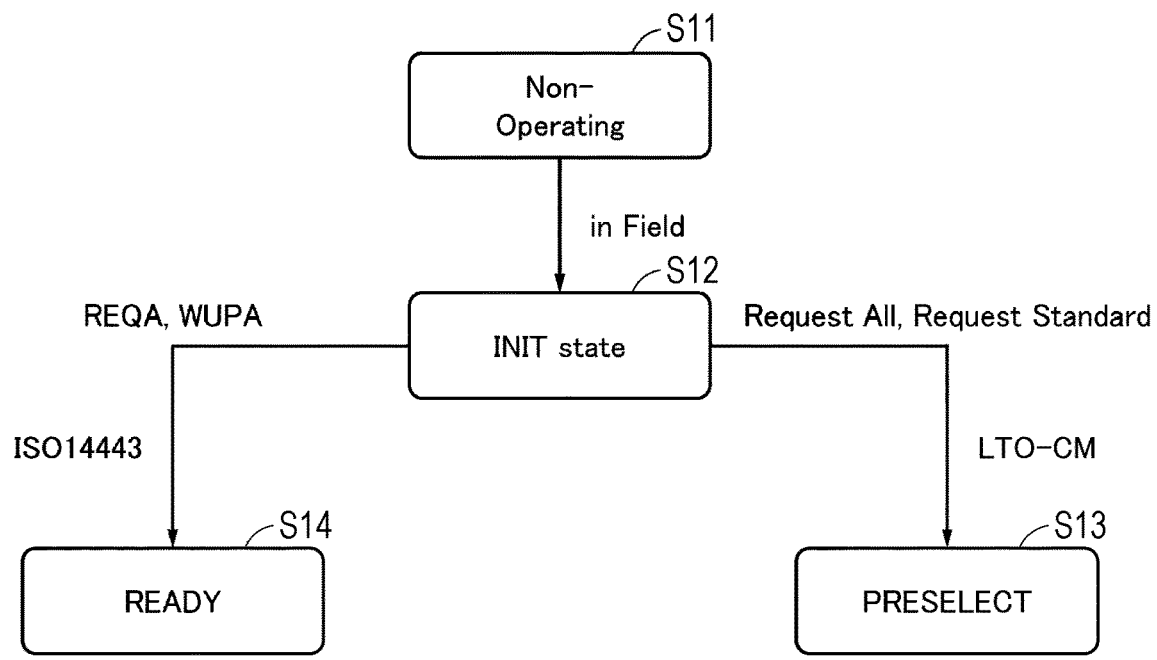
FIG. 5 is a flowchart for explaining an example of an operation of the data management system according to the first embodiment of the present disclosure.

Hereinafter, an example of the operation of the data management system 100 according to the first embodiment of the present disclosure will be described with reference to FIG. 5.

In step S11, the CM 11, that is, the control unit 112, is in the non-operating state. In step S12, the alternating magnetic field emitted from the communication target device is received by the antenna coil 111A, and the control unit 112 becomes the activated state. In this state, in a case where the control unit 112 receives the Request All (4A) command or the Request Standard (45) command from the communication target device via the communication unit 111, in step S13, the control unit 112 transitions to the first mode, more specifically, the PRESELECT state, and can communicate with the recording/reproduction device according to the first communication standard (the communication standard specified by LTO). On the other hand, in a case where the control unit 112 receives the REQA (26) command or the WUPA (52) command from the communication target device via the communication unit 111, the control unit 112 transitions to the second mode, more specifically, the READY state and can communicate with the information terminal 20 with the second communication standard (ISO 14443).

[1.7 Effect]

The CM 11 according to the first embodiment includes the communication unit 111 that performs wireless communication and the control unit 112 that transmits data to the recording/reproduction device and receives data from the recording/reproduction device according to the first communication standard via the communication unit 111 and transmits data to the information terminal 20 according to the second communication standard via the communication unit 111. Therefore, not only the recording/reproduction device but also the information terminal 20 can read data compliant with the LTO standard and the like. Therefore, the user can check the usage history of the tape cartridge 10 on the information terminal 20. Consequently, management, health check, and the like of the tape cartridge 10 are facilitated, and the convenience of the tape cartridge 10 is improved.

In a case where the number of times the tape is pulled out (the thread count) and the like is read from the CM 11 by the information terminal 20, the number of times the magnetic tape MT has been used can be confirmed by the information terminal 20 without loading the magnetic tape MT into the recording/reproduction device.

The user will be able to check the usage history of the tape cartridge 10 on the information terminal (the smartphone) 20 instead of the dedicated device (the dedicated reader/writer). Therefore, compared with the conventional situation in which the usage history can be confirmed only by a dedicated device that is not widely used, it becomes easier to develop cloud-linked applications such as life management, content management, and the like.

Since it is possible to confirm the usage history of the tape cartridge 10 on the information terminal (the smartphone) 20, it is possible to collect the information on the tape cartridge 10 directly from the customer. Also, it is possible to easily collect information on the tape cartridge 10 from local personnel.

Since the CM 11 has the visual information indicating that it is possible to perform communication according to the second communication standard at the position where the antenna coil 111A is provided, it is possible to clarify the touch position (the data acquisition-able position) of the information terminal 20. Also, it is possible to easily identify whether or not the tape cartridge 10 is compatible with the second communication standard.

The second storage area 113B as the extended storage area can store data unique to the smartphone application. Therefore, application data to be shared between a plurality of smartphones (for example, an offline cache of management data on the cloud, an index on liner tape file system (LTFS), and the like) can be stored.

2 SECOND EMBODIMENT

[2.1 Configuration of Recording/Reproduction System]

Figure 12:
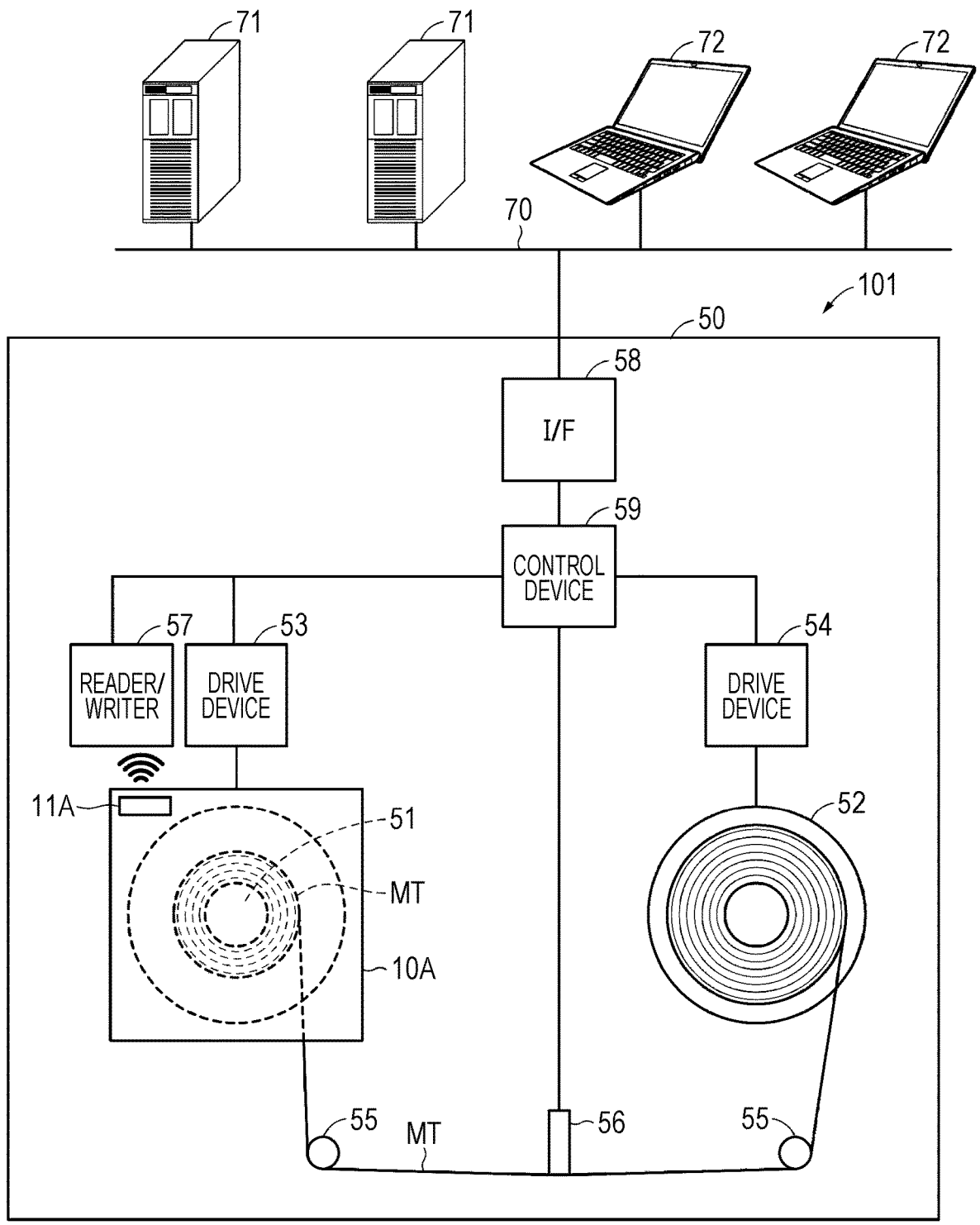
FIG. 12 is a schematic diagram illustrating an example of a configuration of a recording/reproduction system according to the second embodiment of the present disclosure.

FIG. 12 is a schematic diagram illustrating an example of a configuration of a recording/reproduction system 101 according to the second embodiment of the present disclosure. The recording/reproduction system 101 is a magnetic tape recording/reproduction system and includes a tape cartridge 10A and a recording/reproduction device 50 configured to be able to load and unload the tape cartridge 10A.

[2.2 Configuration of Tape Cartridge]

The tape cartridge 10A differs from the tape cartridge 10 in the first embodiment in that it includes a CM 11A instead of the CM 11 (refer to FIG. 2).

Figure 13:
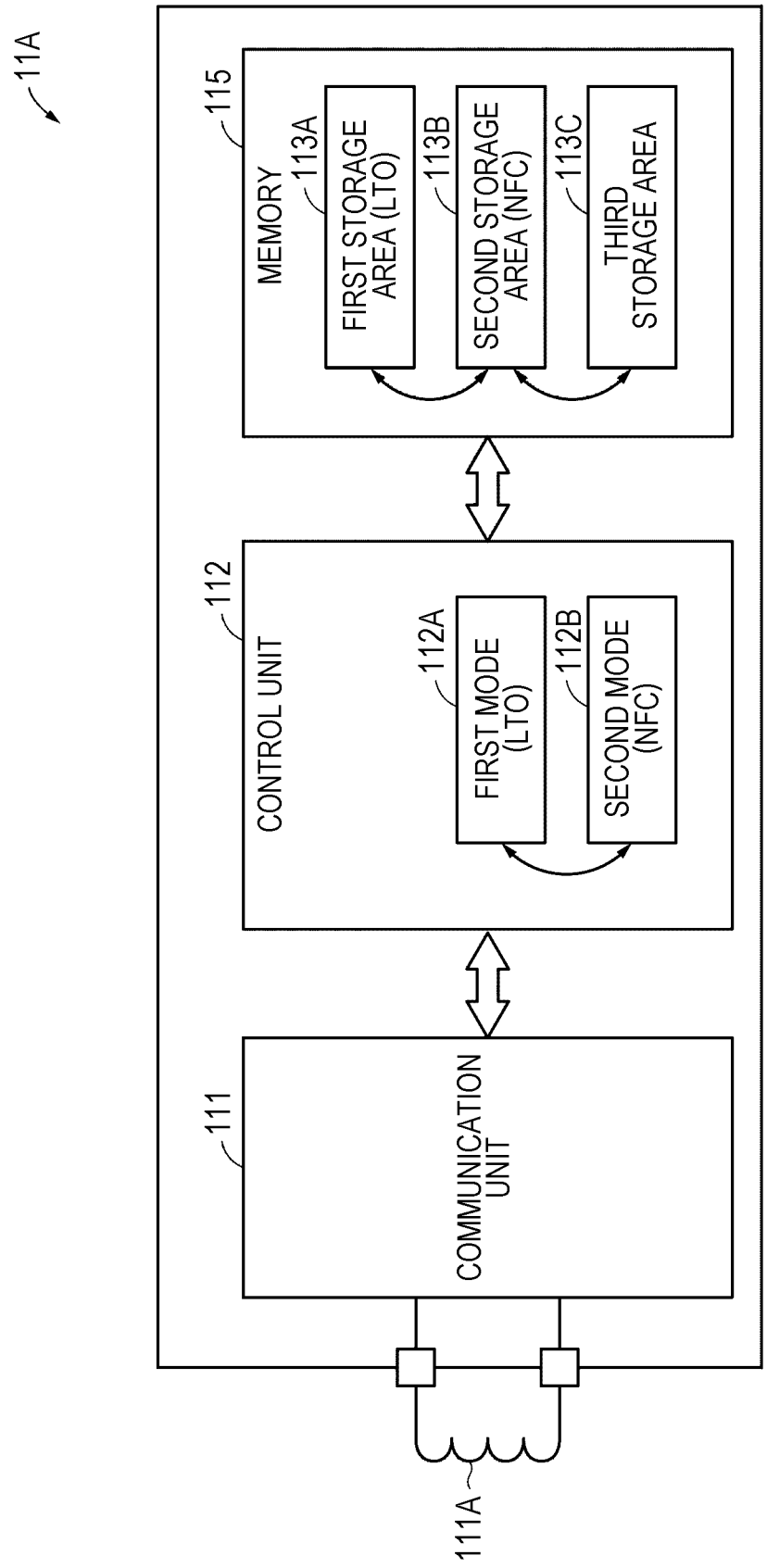
FIG. 13 is a block diagram illustrating an example of a configuration of the cartridge memory.

FIG. 13 illustrates a configuration of the CM 11A used for the tape cartridge 10A. The CM 11A is different from CM 11 in the first embodiment in that the memory 115 further has a third storage area 113C.

The third storage area 113C corresponds to an extended storage area with respect to a storage area of a general CM. The second additional data (the second additional information) is stored in the third storage area 113C. Here, the second additional data means data related to the tape cartridge 10A, which is not specified in the LTO standard. Note that the second additional data is a different type of data from the first additional data. An example of the second additional data is information at the time of data recording such as tension adjustment information and the like, but the data is not limited to these data. The recording/reproduction device 50 can both read and write the data in the third storage area 113C, whereas the information terminal 20 (refer to FIGS. 1 and 4) can only read the data in the third storage area 113C.

The information at the time of data recording means the information related to the tape cartridge 10A (the magnetic tape MT) acquired by the recording/reproduction device 50 at the time of recording the data (the user data) on the magnetic tape MT. The tension adjustment information is an example of information at the time of data recording and is information for adjusting the tension applied in the longitudinal direction of the magnetic tape MT. The tension adjustment information includes the distance between adjacent servo bands (the servo tracks) SB (the distance between servo patterns recorded on the adjacent servo bands (the servo tracks) SB) when recording data on the magnetic tape MT. The distance between the adjacent servo bands SB is an example of width-related information related to the width of the magnetic tape MT.

In the following description, the data stored in the first storage area 113A may be referred to as "first data", the data stored in the second storage area 113B may be referred to as "second data", and the data stored in the third storage area 113C may be referred to as "third data". The first data includes the data compliant with the LTO standard (that is, the data of a general CM). The second data includes the first additional data. The third data includes the second additional data.

In response to a request from the recording/reproduction device 50, the control unit 112 stores the first data received from the recording/reproduction device 50 according to the first communication standard in the first storage area 113A. In response to a request from the recording/reproduction device 50, the control unit 112 reads the first data from the first storage area 113A and transmits the first data to the recording/reproduction device 50 according to the first communication standard.

In response to a request from the recording/reproduction device 50, the control unit 112 stores the third data received from the recording/reproduction device 50 according to the first communication standard in the third storage area 113C. In response to a request from the recording/reproduction device 50, the control unit 112 reads the third data from the third storage area 113C and transmits the third data to the recording/reproduction device 50 according to the first communication standard.

In response to a request from the information terminal 20, the control unit 112 stores the second data received from the information terminal 20 according to the second communication standard in the second storage area 113B. In response to a request from the information terminal 20, the control unit 112 reads the first data from the first storage area 113A and transmits the first data to the information terminal 20 according to the second communication standard. In response to a request from the information terminal 20, the control unit 112 reads the second data from the second storage area 113B and transmits the second data to the information terminal 20 according to the second communication standard. In response to a request from the information terminal 20, the control unit 112 reads the third data from the third storage area 113C and transmits the third data to the information terminal 20 according to the second communication standard.

[2.3 Configuration of Recording/Reproduction Device]

The recording/reproduction device 50 records and reproduces the magnetic tape MT. The recording/reproduction device 50 has a configuration capable of adjusting the tension applied in the longitudinal direction of the magnetic tape MT. Also, the recording/reproduction device 50 has a configuration capable of loading the tape cartridge 10A. Here, for the sake of simplicity, a case where the recording/reproduction device 50 has a configuration capable of loading one tape cartridge 10A will be described, but the recording/reproduction device 50 may have a configuration capable of loading a plurality of tape cartridges 10A.

The recording/reproduction device 50 is connected to information processing devices such as a server 71, a personal computer (hereinafter referred to as "PC") 72, and the like via a network 70, and the recording/reproduction device 50 is configured to be able to record data supplied from these information processing devices in the tape cartridge 10A. Also, in response to a request from these information processing devices, the recording/reproduction device 50 is configured to be able to reproduce data from the tape cartridge 10A and supply the data to these information processing devices. The shortest recording wavelength of the recording/reproduction device 50 is preferably 96 nm or less, more preferably 88 nm or less, and even more preferably 80 nm or less.

As illustrated in FIG. 12, the recording/reproduction device 50 includes a spindle 51, a reel 52 on the recording/reproduction device 50 side, a spindle drive device 53, a reel drive device 54, a plurality of guide rollers 55, a magnetic head (a head unit) 56, a reader/writer 57 as a communication unit, a communication interface (hereinafter, I/F) 58, and a control device 59.

The spindle 51 is configured to be able to mount the tape cartridge 10A. A servo pattern similar to an inverted V shape is recorded preliminarily on the magnetic tape MT as a servo signal. The reel 52 is configured to be able to fix a tip (a leader pin 19A) of the magnetic tape MT drawn from the tape cartridge 10A via a tape loading mechanism (not illustrated in the drawings).

The spindle drive device 53 rotates the spindle 51 in response to a command from the control device 59. The reel drive device 54 rotates the reel 52 in response to a command from the control device 59. The plurality of guide rollers 55 guides the traveling of the magnetic tape MT so that the tape paths formed between the tape cartridge 10A and the reel 52 have a predetermined relative positional relationship with respect to the magnetic head 56.

When data is recorded on the magnetic tape MT or when data is reproduced from the magnetic tape MT, the spindle drive device 53 and the reel drive device 54 rotationally drive the spindle 51 and the reel 52 to run the magnetic tape MT. The traveling direction of the magnetic tape MT is regarded to be able to reciprocate in the forward direction (the direction in which the magnetic tape MT flows from the tape cartridge 10A side to the reel 52 side) and the reverse direction (the direction in which the magnetic tape MT flows from the reel 52 side to the tape cartridge 10A side).

In the second embodiment, the spindle drive device 53 controls the rotation of the spindle 51 and the reel drive device 54 controls the rotation of the reel 52 so that the tension in the longitudinal direction of the magnetic tape MT at the time of data recording or data reproduction is said to be adjustable. Note that the tension of the magnetic tape MT may be adjusted by controlling the movement of the guide roller 55 instead of controlling the rotation of the spindle 51 and the reel 52 or in addition to controlling the rotation of the spindle 51 and the reel 52.

The reader/writer 57 is configured to be able to write the first data and the third data to the CM 11A in response to a command from the control device 59. Also, the reader/writer 57 is configured to be able to read the first data and the third data from the CM 11A in response to a command from the control device 59. As the communication method between the reader/writer 57 and the CM 11A, the first communication standard described in the first embodiment is adopted. The third data includes the tension adjustment information. The tension adjustment information is an example of information at the time of data recording.

The control device 59 includes, for example, a control unit, a storage unit, a communication unit, and the like. The control unit includes, for example, a central processing unit (CPU) and the like and controls each unit of the recording/reproduction device 50 according to a program stored in the storage unit. For example, in response to a request from the information processing device such as the server 71, the PC 72, and the like, the control device 59 records the data signal supplied from the information processing device on the magnetic tape MT by the magnetic head 56. Also, in response to a request from the information processing device such as the server 71, the PC 72, and the like, the control device 59 reproduces the data signal recorded on the magnetic tape MT by the magnetic head 56 and supplies the data signal to the information processing device.

The storage unit includes a non-volatile memory in which various data and various programs are recorded and a volatile memory used as a work area of the control unit. The various programs described above may be read from a portable recording medium such as an optical disk and the like or a portable storage device such as a semiconductor memory and the like, or may be downloaded from a server device on a network.

The control device 59 reads the servo signals recorded in the two adjacent servo bands SB by the magnetic head 56 when recording data on the magnetic tape MT or when reproducing data from the magnetic tape MT. The control device 59 uses the servo signals read from the two servo bands SB to control the position of the magnetic head 56 so that the magnetic head 56 follows the servo pattern.

When recording data on the magnetic tape MT, the control device 59 obtains a distance d1 between the two adjacent servo bands SB (a distance in the width direction of the magnetic tape MT) from reproduced waveforms of the servo signals read from the two adjacent servo bands SB. Then, the obtained distance is written by the reader/writer 57 to the third storage area 113C of the memory 115.

When reproducing data from the magnetic tape MT, the control device 59 obtains a distance d2 between the two adjacent servo bands SB (a distance in the width direction of the magnetic tape MT) from reproduced waveforms of the servo signals read from the two adjacent servo bands SB. At the same time, the control device 59 reads out, by the reader/writer 57 from the third storage area 113C of the memory 115, the distance d1 between the two adjacent servo bands SB obtained when recording data on the magnetic tape MT. The control device 59 controls the rotation of the spindle drive device 53 and the reel drive device 54 and adjusts the tension applied in the longitudinal direction of the magnetic tape MT, so that a difference Δd between the distance d1 between the servo bands SB obtained when recording data on the magnetic tape MT and the distance d2 between the servo bands SB obtained when reproducing data from the magnetic tape MT fits within a specified range. The control of this tension adjustment is performed by, for example, feedback control.

The magnetic head 56 is configured to be able to record data on the magnetic tape MT in response to a command from the control device 59. Also, the magnetic head 56 is configured to be able to reproduce data recorded on the magnetic tape MT in response to a command from the control device 59. The magnetic head 56 has, for example, two servo read heads 56A and 56B (refer to FIG. 8), a plurality of data write/read heads, and the like.

The servo read heads 56A and 56B are configured to be able to reproduce the servo signal by reading a magnetic field generated from the servo signal recorded on the magnetic tape MT by a magnetoresistive (MR) element and the like. A distance between the two servo read heads 56A and 56B in the width direction is regarded to be substantially the same as the distance between the two adjacent servo bands SB.

The data write/read heads are arranged at positions sandwiched between the two servo read heads 56A and 56B at equal intervals along a direction from one servo read head 56A to the other servo read head 56B. The data write/read head is configured to be able to record data on the magnetic tape MT by a magnetic field generated from a magnetic gap.

Also, the data write/read head is configured to be able to reproduce data by reading a magnetic field generated from the data recorded on the magnetic tape MT with the MR element and the like.

The communication I/F 58 is for communicating with information processing devices such as the server 71, the PC 72, and the like, and is connected to the network 70.

[2.4 Operation of Recording/Reproduction Device at the Time of Data Recording]

Figure 14:
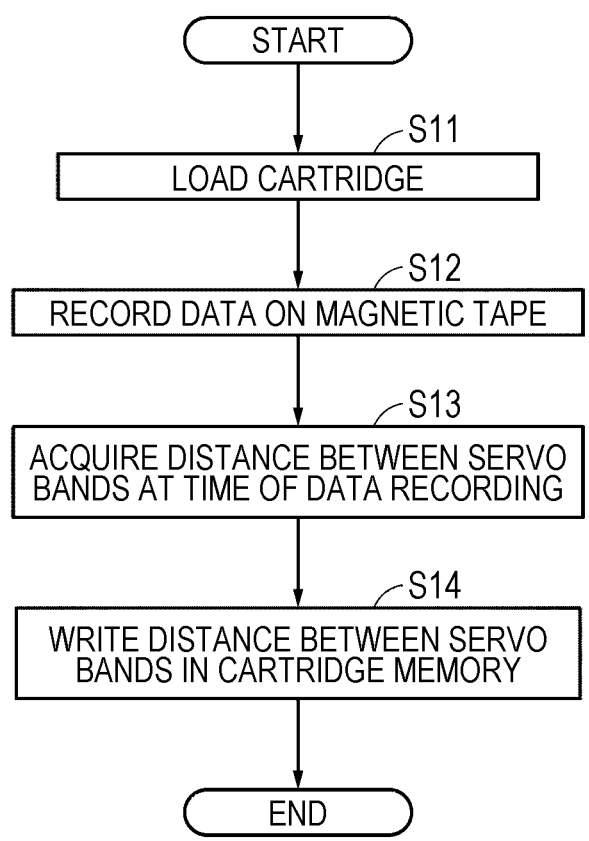
FIG. 14 is a flowchart for explaining an example of an operation of a recording/reproduction device at the time of data recording.

Hereinafter, an example of an operation of the recording/reproduction device 50 at the time of data recording will be described with reference to FIG. 14.

First, the control device 59 loads the tape cartridge 10A into the recording/reproduction device 50 (step S11). Next, the control device 59 controls the rotation of the spindle 51 and the reel 52 and causes the magnetic tape MT to travel while applying a specified tension in the longitudinal direction of the magnetic tape MT. Then, the control device 59 reads the servo signal by the servo read heads 56A and 56B of the magnetic head 56 and records the data on the magnetic tape MT by the data write/read head of the magnetic head 56 (step S12).

At this time, while tracing the two servo bands SB adjacent to each other by the two servo read heads 56A and 56B of the magnetic head 56, the magnetic head 56 records the data to the data band DB by the write/read head of the magnetic head 56.

Next, the control device 59 obtains the distance d1 between the two adjacent servo bands SB at the time of data recording from reproduced waveforms of the servo signals read by the servo read heads 56A and 56B of the magnetic head 56 (step S13). Next, the control device 59 writes the distance d1 between the servo bands SB at the time of data recording to the third storage area 113C of CM 11A by the reader/writer 57 (step S14). The control device 59 may measure the distance d1 between the servo bands SB continuously and write the distance d1 to the third storage area 113C of the CM 11A or may measure the distance d1 between the servo bands SB discontinuously and write the distance d1 to the third storage area 113C of the CM 11A. In a case of measuring the distance d1 between the servo bands SB discontinuously and writing the distance d1 to the third storage area 113C of the CM 11A, it is possible to reduce the amount of information that is written to the memory 115.

Here, "measuring the distance d1 between the servo bands SB continuously" means measuring the distance d1 between the servo bands SB at each point (for example, about every 6 mm) where there is position information of the servo. "Measuring the distance d1 between the servo bands SB discontinuously" means measuring the distance d1 between the servo bands SB at a certain point in a discrete manner (at a rate of one in a specified number of points) where there is the position information of the servo.

[2.5 Operation of Recording/Reproduction Device at the Time of Data Reproduction]

Figure 15:
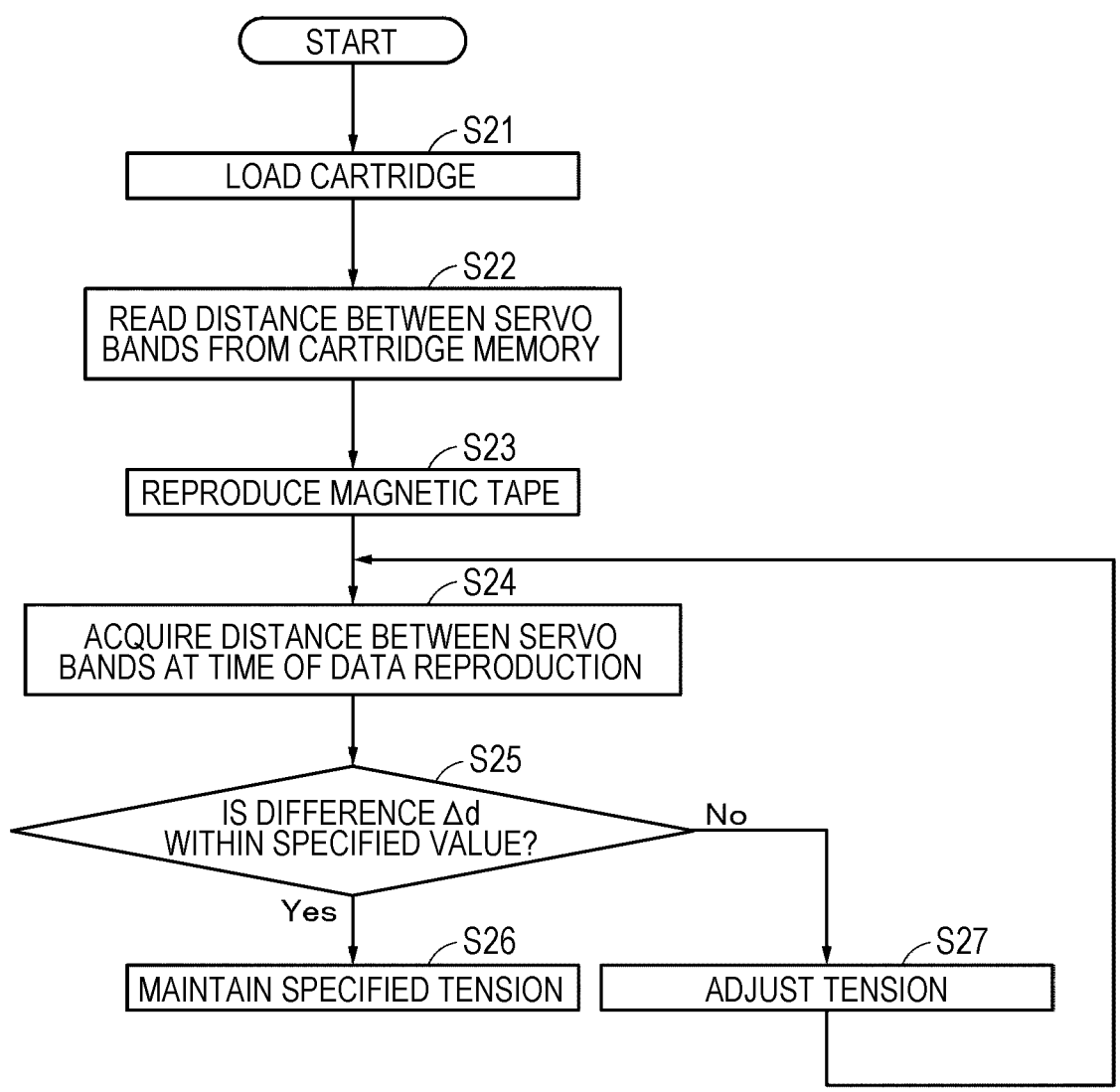
FIG. 15 is a flowchart for explaining an example of an operation of the recording/reproduction device at the time of data reproduction.

Hereinafter, an example of an operation of the recording/reproduction device 50 at the time of data reproduction will be described with reference to FIG. 15.

First, the control device 59 loads the tape cartridge 10A into the recording/reproduction device 50 (step S21). Next, the control device 59 reads the distance d1 between the servo bands SB at the time of recording from the third storage area 113C of the CM 11A by the reader/writer 57 (step S22).

Next, the control device 59 controls the rotation of the spindle 51 and the reel 52 and causes the magnetic tape MT to travel while applying a specified tension in the longitudinal direction of the magnetic tape MT. Then, the control device 59 reads the servo signal by the servo read heads 56A and 56B of the magnetic head 56 and reproduces the data from the magnetic tape MT by the data write/read head of the magnetic head 56 (step S23).

Next, the control device 59 calculates the distance d2 between the two adjacent servo bands SB at the time of data reproduction from reproduced waveforms of the servo signals read by the servo read heads 56A and 56B of the magnetic head 56 (step S24).

Next, the control device 59 determines whether or not a difference Δd between the distance d1 between the servo bands SB read in step S22 and the distance d2 between the servo bands SB calculated in step S24 is within the specified value. (step S25).

In a case where it is determined in step S25 that the difference Δd is within the specified value, the control device 59 controls the rotation of the spindle 51 and the reel 52 so that the specified tension is maintained (step S26).

On the other hand, in a case of being determined in step S25 that the difference Δd is not within the specified value, the control device 59 controls the rotation of the spindle 51 and the reel 52 so that the difference Δd becomes small and adjusts the tension applied to the traveling magnetic tape MT, and the process returns to step S24 (step S27).

[2.6 Effect]

As described above, in the second embodiment, the average thickness $t_T$ of the magnetic tape MT is $t_T \leq 5.5$ [μm], and the amount of dimensional change Δw in the width direction of the magnetic tape MT with respect to the tension change in the longitudinal direction of the magnetic tape MT is 650 [ppm/N]≤Δw. Also, the memory (the storage unit) 115 of the CM 11A has an area for writing width-related information related to the width of the magnetic tape MT at the time of data recording (the third storage area 113C). Therefore, even in a case where the width of the magnetic tape MT fluctuates for some reason (for example, a change in temperature, humidity, and the like), by using the width-related information described above at the time of data reproduction and adjusting the tension in the longitudinal direction of the magnetic tape MT by the recording/reproduction device 50, it is possible to suppress a change in the width of the magnetic tape MT. Therefore, even in a case where the width of the magnetic tape MT fluctuates for some reason, it is possible to suppress a decrease in reliability of reproduction (for example, an occurrence of off-track).

Also, in the second embodiment, the CM 11A includes the control unit 112 that reads the information at the time of data recording (the third data) such as tension adjustment information and the like from the third storage area 113C of the memory 115 in response to the request from the information terminal 20 and transmits the information at the time of data recording to the information terminal 20 according to the second communication standard. Therefore, the information terminal 20 can also read the information at the time of data recording. Therefore, the user can confirm the information at the time of data recording of the tape cartridge 10A on the information terminal 20. Consequently, the user can perform a health check and the like of the magnetic tape MT on the basis of the information at the time of data recording of the tape cartridge 10A.

3 THIRD EMBODIMENT

[3.1 Configuration of Recording/Reproduction Device]

Figure 16:
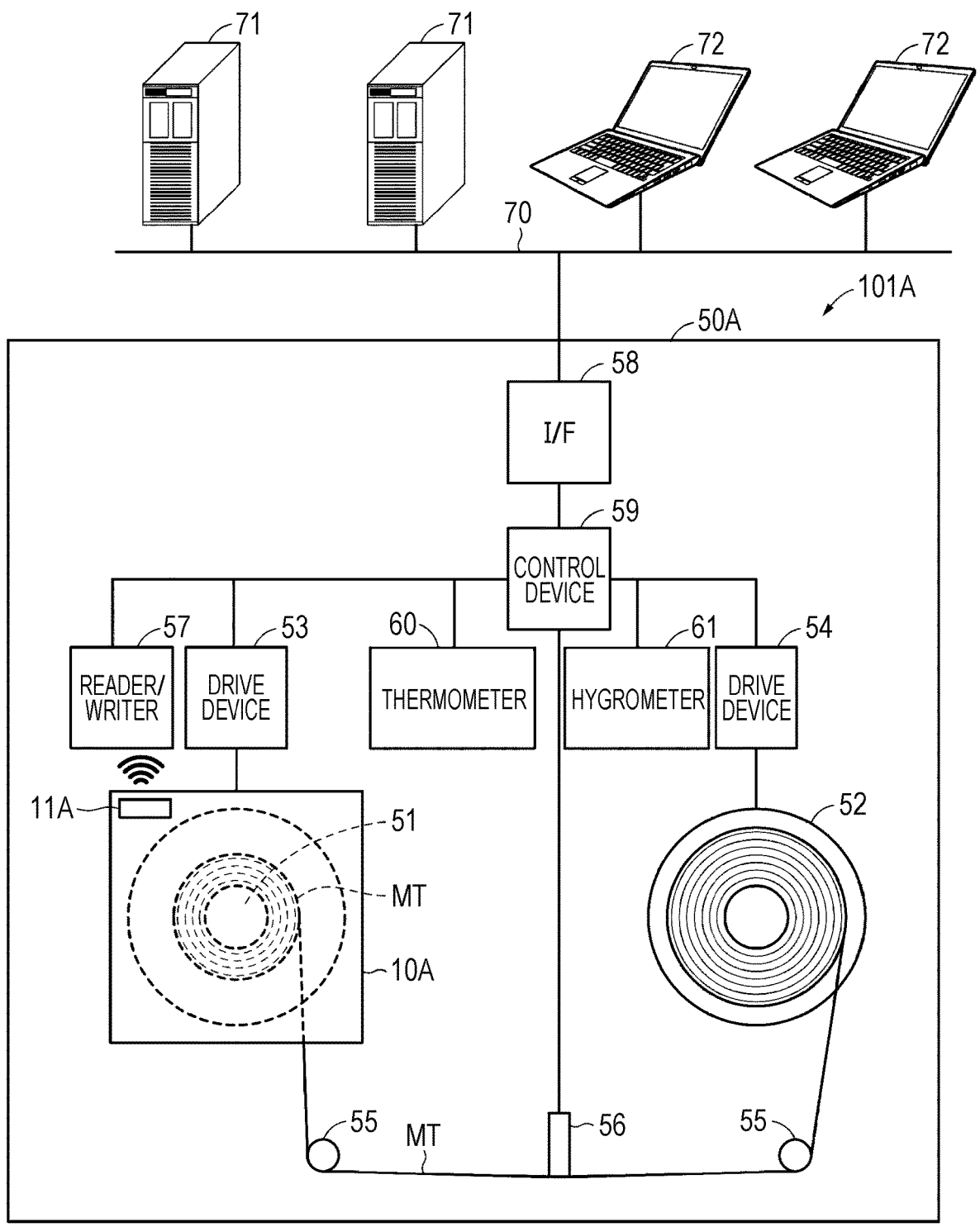
FIG. 16 is a schematic diagram illustrating an example of a configuration of the recording/reproduction system according to the third embodiment of the present disclosure.

FIG. 16 is a schematic diagram illustrating an example of a configuration of the recording/reproduction system 101A according to the third embodiment of the present disclosure. The recording/reproduction system 101A includes a tape cartridge 10A and a recording/reproduction device 50A.

The recording/reproduction device 50A further includes a thermometer 60 and a hygrometer 61. The thermometer 60 measures a temperature around the magnetic tape MT (the tape cartridge 10A) and outputs the temperature to the control device 59. Also, the hygrometer 61 measures a humidity around the magnetic tape MT (the tape cartridge 10A) and outputs the humidity to the control device 59.

The control device 59 measures the temperature Tm1 and the humidity H1 around the magnetic tape MT (the tape cartridge 10A) by the thermometer 60 and the hygrometer 61 when recording data on the magnetic tape MT and write the temperature Tm1 and the humidity H1 to the third storage area 113C of the memory 115 via the reader/writer 57. The temperature Tm1 and the humidity H1 are examples of environmental information around the magnetic tape MT.

The control device 59 obtains a tension Tn1 applied in the longitudinal direction of the magnetic tape MT on the basis of the drive data of the spindle 51 and the reel 52 when recording data on the magnetic tape MT and write the tension Tn1 to the third storage area 113C of the memory 115 via the reader/writer 57.

The control device 59 obtains a distance d1 between the two adjacent servo bands SB from reproduced waveforms of the servo signals read from the two adjacent servo bands SB when recording data on the magnetic tape MT. Then, on the basis of this distance d1, a width W1 of the magnetic tape MT when recording data is calculated, and the reader/writer 57 writes the width W1 in the third storage area 113C of the memory 115.

The control device 59 measures a temperature Tm2 and a humidity H2 around the magnetic tape MT (the tape cartridge 10A) by the thermometer 60 and the hygrometer 61 when reproducing data from the magnetic tape MT.

The control device 59 obtains a tension Tn2 applied in the longitudinal direction of the magnetic tape MT on the basis of the drive data of the spindle 51 and the reel 52 when reproducing data from the magnetic tape MT.

The control device 59 obtains a distance d2 between the two adjacent servo bands SB from reproduced waveforms of the servo signals read from the two adjacent servo bands SB when reproducing data from the magnetic tape MT. Then, on the basis of this distance d2, a width W2 of the magnetic tape MT at the time of data reproduction is calculated.

The control device 59 reads the temperature Tm1, the humidity H1, the tension Tn1, and the width W1 written at the time of data recording from the third storage area 113C of the memory 115 via the reader/writer 57 when reproducing data from the magnetic tape MT. Then, the control device 59 uses the temperature Tm1, the humidity H1, the tension Tn1, and the width W1, at the time of data recording, and the temperature Tm2, the humidity H2, the tension Tn2, and the width W2, at the time of data reproduction, and controls the tension applied to the magnetic tape MT so that the width W2 of the magnetic tape MT at the time of data reproduction is equal to or substantially equal to the width W1 of the magnetic tape at the time of data recording.

The control unit 112 of the CM 11A stores the temperature Tm1, the humidity H1, the tension Tn1, and the width W1 received from the recording/reproduction device 50A via the antenna coil 111A in the third storage area 113C of the memory 115. The control unit 112 of the CM 11A reads the temperature Tm1, the humidity H1, the tension Tn1, and the width W1 from the third storage area 113C of the memory 115 in response to a request from the recording/reproduction device 50A and transmits the temperature Tm1, the humidity H1, the tension Tn1, and the width W1 to the recording/reproduction device 50A via the antenna coil 111A.

[3.2 Operation of Recording/Reproduction Device at the Time of Data Recording]

Figure 17:
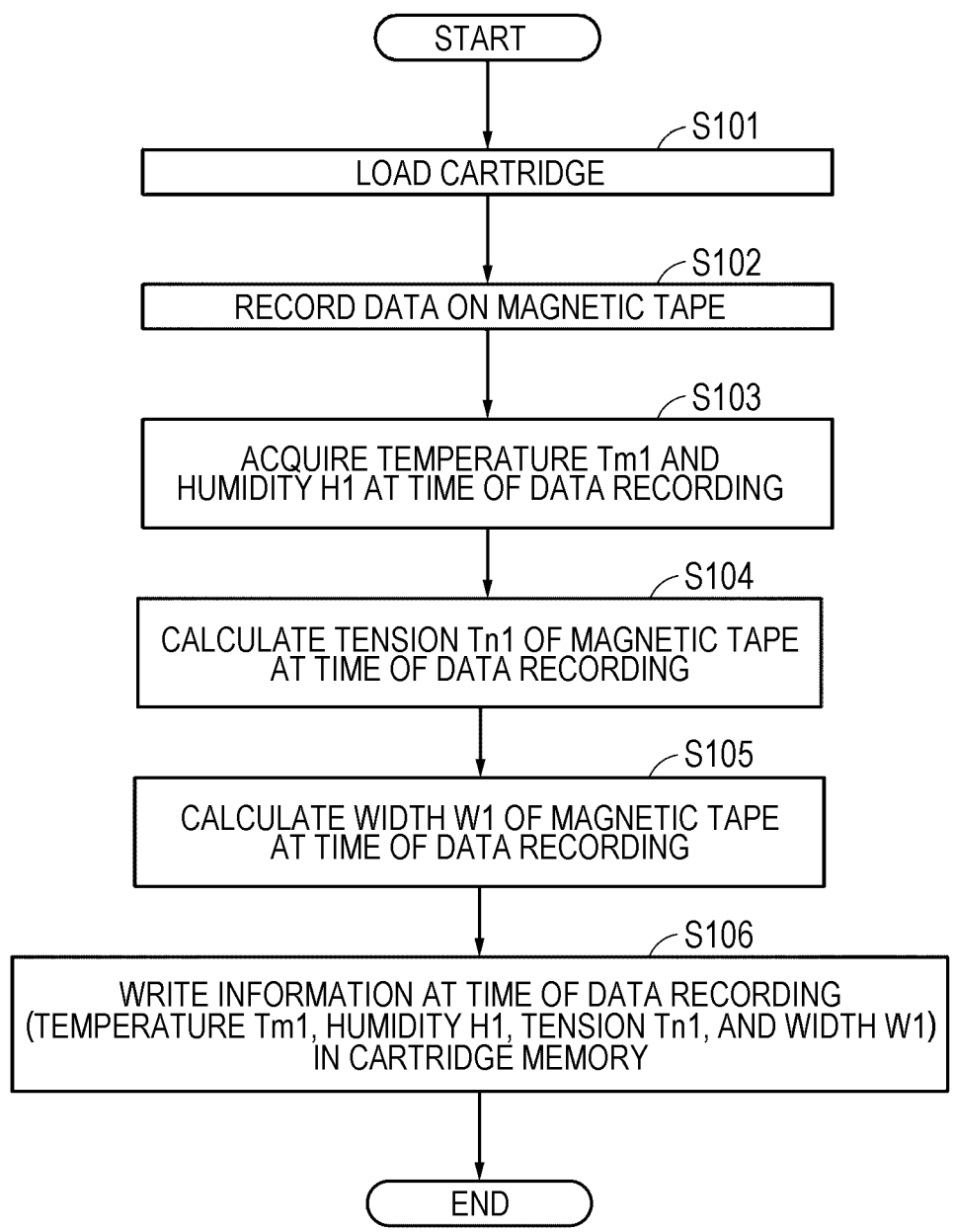
FIG. 17 is a flowchart for explaining an example of an operation of the recording/reproduction device at the time of data recording.

Hereinafter, an example of an operation of the recording/reproduction device 50A at the time of data recording will be described with reference to FIG. 17.

First, the control device 59 loads the tape cartridge 10A into the recording/reproduction device 50A (step S101). Next, the control device 59 controls the rotation of the spindle 51 and the reel 52 and causes the magnetic tape MT to travel while applying a specified tension in the longitudinal direction of the magnetic tape MT. Then, the control device 59 records data on the magnetic tape MT by the magnetic head 56 (step S102).

Next, the control device 59 acquires a temperature Tm1 and a humidity H1 (environmental information) around the magnetic tape MT at the time of data recording from the thermometer 60 and the hygrometer 61 (step S103).

Next, the control device 59 calculates a tension Tn1 applied in the longitudinal direction of the magnetic tape MT at the time of data recording on the basis of the drive data of the spindle 51 and the reel 52 at the time of data recording (step S104).

Next, the control device 59 obtains a distance d1 between the two adjacent servo bands SB from reproduced waveforms of the servo signals read by the servo read heads 56A and 56B of the magnetic head 56. Next, the control device 59 calculates a width W1 of the magnetic tape MT at the time of data recording on the basis of this distance d1 (step S105).

Next, the control device 59 writes the temperature Tm1, the humidity H1, the tension Tn1, and the width W1 of the magnetic tape MT to the third storage area 113C of the memory 115 as information at the time of data recording by the reader/writer 57 (step S106).

[3.3 Operation of Recording/Reproduction Device at the Time of Data Reproduction]

Hereinafter, an example of an operation of the recording/reproduction device 50A at the time of data reproduction will be described with reference to FIG. 18.

First, the control device 59 loads the tape cartridge 10A into the recording/reproduction device 50A (step S111). Next, the control device 59 reads and acquires the information at the time of data recording (the temperature Tm1, the humidity H1, the tension Tn1, and the width W1 of the magnetic tape MT) written in the third storage area 113C of the memory 115 from the third storage area 113C of the memory 115 by the reader/writer 57 (step S112). Next, the control device 59 acquires information of a temperature Tm2 and information of a humidity H2 around the present magnetic tape MT at the time of data reproduction, by the thermometer 60 and the hygrometer 61 (step S113).

Next, the control device 59 calculates a temperature difference TmD (TmD=Tm2−Tm1) between the temperature Tm1 at the time of data recording and the temperature Tm2 at the time of data reproduction (step S114). Also, the control device 59 calculates a humidity difference HD (HD=H2−H1) between the humidity H1 at the time of data recording and the humidity H2 at the time of data reproduction (step S115).

Next, the control device 59 multiplies the temperature difference TmD by the coefficient α (TmD×α) and multiplies the humidity difference HD by the coefficient β (HD×β) (step S116). The coefficient α is a value indicating how much the tension of the magnetic tape MT is only required to be changed compared to the tension Tn1 at the time of data recording, per 1° C. of the temperature difference. The coefficient β is a value indicating how much the tension of the magnetic tape MT is only required to be changed compared to the tension Tn1 at the time of data recording, per 1% of the humidity difference.

Next, the control device 59, by adding a value of TmD×α and a value of HD×β to the tension Tn1 at the time of data recording, calculates the tension Tn2 that should be applied in the longitudinal direction of the magnetic tape MT at the time of data reproduction (present) (step S117).

$$Tn2=Tn1+TmD\times\alpha+HD\times\beta$$

After determining the tension Tn2 of the magnetic tape MT at the time of data reproduction, the control device 59 controls the rotation of the spindle 51 and the reel 52 and controls the traveling of the magnetic tape MT so that the magnetic tape MT travels with the tension Tn2. Then, while reading the servo signal of the servo band SB by the servo read heads 56A and 56B of the magnetic head 56, the control device 59 reproduces the data recorded in a data track Tk by the data write/read head of the magnetic head 56 (step S118).

At this time, since the width of the magnetic tape MT is adjusted to the width at the time of data recording by adjusting the tension of the magnetic tape MT, the data write/read head of the magnetic head 56 can be accurately positioned with respect to the data track Tk. Therefore, even in a case where the width of the magnetic tape MT fluctuates for some reason (for example, fluctuations in temperature or humidity), it is possible to reproduce the data recorded on the magnetic tape MT accurately.

Note that, at the time of data reproduction (present), the value of the tension Tn2 that should be applied to the magnetic tape MT becomes higher if the temperature at the time of data reproduction is higher than the temperature at the time of data recording. Therefore, in a case where the temperature rises and the width of the magnetic tape MT becomes wider than that at the time of data recording, the width of the magnetic tape MT can be narrowed to reproduce the same width as at the time of data reproduction.

On the contrary, at the time of data reproduction (present), the value of the tension Tn2 that should be applied to the magnetic tape MT becomes lower if the temperature at the time of data reproduction is lower than the temperature at the time of data recording. Therefore, in a case where the temperature becomes low and the width of the magnetic tape MT becomes narrower than that at the time of data recording, the width of the magnetic tape MT can be widened to reproduce the same width as at the time of data reproduction.

Also, at the time of data reproduction (present), the value of the tension Tn2 that should be applied to the magnetic tape MT becomes higher if the humidity at the time of data reproduction is higher than the humidity at the time of data recording. Therefore, in a case where the humidity becomes high and the width of the magnetic tape MT becomes wider than that at the time of data recording, the width of the magnetic tape MT can be narrowed to reproduce the same width as at the time of data reproduction.

On the contrary, at the time of data reproduction (present), the value of the tension Tn2 that should be applied to the magnetic tape MT becomes lower if the humidity at the time of data reproduction is lower than the humidity at the time of data recording. Therefore, in a case where the humidity becomes low and the width of the magnetic tape MT becomes narrower than that at the time of data recording, the width of the magnetic tape MT can be widened to reproduce the same width as at the time of data reproduction.

Here, in order to obtain the tension Tn2 that should be applied to the magnetic tape MT at the time of data reproduction, it is also further possible to use the information of the width W1 of the magnetic tape MT at the time of data recording in addition to the temperature Tm1, the humidity H1, and the tension Tn1 of the magnetic tape MT at the time of data recording (or instead of the tension Tn1).

In this case as well, the control device 59 similarly calculates the temperature difference TmD (TmD=Tm2−Tm1) and the humidity difference HD (HD=H2−H1). Then, the control device 59 multiplies the temperature difference TmD by the coefficient γ (TmD×γ) and multiplies the humidity difference HD by the coefficient δ (HD×δ) (step S116).

Here, the coefficient γ is a value indicating how much the width of the magnetic tape MT fluctuates per 1° C. of the temperature difference (a value indicating an expansion rate per unit length (in the width direction) based on the temperature). Also, the coefficient δ is a value indicating how much the width of the magnetic tape MT fluctuates per 1% of the humidity difference (a value indicating an expansion rate per unit length (in the width direction) based on the humidity).

Next, the control device 59 predicts a width W2 of the current magnetic tape MT at the time of data reproduction on the basis of the width W1 of the past magnetic tape MT at the time of data recording by the following equation.

$$W2=W1(1+TmD\times\gamma+HD2\times\delta)$$

Next, the control device 59 calculates the difference WD between the width W2 of the current magnetic tape MT at the time of data reproduction and the width W1 of the past magnetic tape MT at the time of data recording (WD=W2−W1=W1(TmD×γ+HD2×δ)).

Then, the control device 59 adds a value obtained by multiplying the width difference WD by a coefficient ε to the tension Tn1 of the magnetic tape MT at the time of data recording to calculate the tension Tn2 of the magnetic tape MT at the time of data reproduction.

$$Tn2=Tn1+WD\times E$$

Here, the coefficient ε is a value representing a tension in the longitudinal direction of the magnetic tape MT required to change the width of the magnetic tape MT by a unit distance.

After determining the tension Tn2 of the magnetic tape MT at the time of data reproduction, the control device 59 controls the rotation of the spindle 51 and the reel 52 and controls the traveling of the magnetic tape MT so that the magnetic tape MT travels with the tension Tn2. Then, while reading the servo signal of the servo band SB by the servo read heads 56A and 56B of the magnetic head 56, the control device 59 reproduces the data recorded in the data track Tk by the data write/read head of the magnetic head 56.

Even in the case of determining the tension Tn2 by such a method, it is possible to reproduce the data recorded on the magnetic tape MT accurately in a case where the width of the magnetic tape MT fluctuates for some reason (for example, fluctuations in temperature and humidity).

[3.4 Effect]

As described above, in the third embodiment, the information at the time of data recording (the environmental information) of the magnetic tape MT is stored in the third storage area 113C of the memory 115, and by using this information at the time of data reproduction, it is possible to adjust the width of the magnetic tape MT appropriately. Therefore, even in a case where the width of the magnetic tape MT fluctuates for some reason, it is possible to reproduce the data recorded on the magnetic tape MT accurately.

Also, in the third embodiment, the temperature Tm1 and the humidity H1 (the environmental information) around the magnetic tape MT at the time of data recording are written in the third storage area 113C of the memory 115 as the information at the time of data recording. Therefore, it is possible to appropriately cope with the fluctuation of the width of the magnetic tape MT and the width of the data track Tk due to the fluctuation of temperature and humidity.

Also, in the third embodiment, the CM 11A includes the control unit 112 that reads the temperature Tm1 and the humidity H1 (the environmental information) around the magnetic tape MT at the time of data recording as the information at the time of data recording from the third storage area 113C in response to the request from the information terminal 20 and transmits the temperature Tm1 and the humidity H1 to the information terminal 20 according to the second communication standard. Therefore, the information terminal 20 can also read the environmental information described above. Therefore, the user can confirm the environmental information described above on the information terminal 20. Consequently, the user can perform a health check of the magnetic tape MT and the like on the basis of the environmental information described above.

4 MODIFICATION EXAMPLE

Modification Example 1

In the first to third embodiments described above, the case where the tape cartridges 10 and 10A are compliant with the LTO standard has been described, but the tape cartridges 10 and 10A may be compliant with the magnetic tape standard other than the LTO standard, for example, the IBM standard such as IBM 3592 and the like.

Modification Example 2

In the first embodiment described above, the case where the CM 11 includes one memory 113 exceeding 16 KB has been described, but the CM 11 may include two or more memories 113 exceeding 16 KB. In this case, one memory 113 is used for the first storage area 113A, and the other memory 113 is used for the second storage area 113B.

Modification Example 3

In the first embodiment described above, the case where the control unit 112 stores the data received from the information terminal 20 according to the second communication standard in the memory 113 in response to the request from the information terminal 20 has been described, but it is also possible for the control unit 112 not to store the data received from the information terminal 20 in the memory 113 or refuse to receive the data from the information terminal 20. In this case, the memory 113 is not required to have the second storage area 113B.

Modification Example 4

In the first embodiment described above, the case where the communication unit 111 includes one antenna coil 111A compliant with both the first communication standard and the second communication standard has been described, but as illustrated in FIG. 6A, the communication unit 111 may also include the antenna 111B compliant with the first communication standard and the antenna 111C compliant with the second communication standard. Also, the CM 11 may separately include a communication unit compliant with the first communication standard and a communication unit compliant with the second communication standard.

In a case of adopting the configuration described above, in order to clarify the touch position (the data acquisition position) of the information terminal 20, the tape cartridge 10 preferably includes the visual information indicating that it is possible to communicate according to the second communication standard at the position where the antenna 111C is provided.

Modification Example 5

As illustrated in FIG. 6B, the tape cartridge 10 may further include a communication unit (not illustrated in the drawings) communicating with the information terminal 20 according to the third communication standard and having the antenna 111D, and a button battery 114 for supplying electric power to each unit of the CM 11 such as the control unit 112 and the like at the time of communicating with the information terminal 20 according to the third communication standard. The third communication standard is a communication standard whose communication speed is faster than that of the first communication standard and the second communication standard, for example, the Wi-Fi (registered trademark) standard or the Bluetooth (registered trademark) standard.

The control unit 112 exchanges pairing information with the information terminal 20 according to the second communication standard. Once the pairing is established, the control unit 112 can communicate with the information terminal 20 according to the third communication standard. Therefore, it is possible to transmit data at high-speed.

As the extended storage area, the second storage area 113B stores data to be transmitted to the information terminal 20 according to the third communication standard (for example, thumbnail information of a moving image and the like stored in the magnetic tape MT) and data received from the information terminal 20 according to the third communication standard. Note that, apart from the memory 113, the CM 11 may further include a non-volatile memory such as a flash memory and the like and store the data to be transmitted to the information terminal 20 according to the third communication standard and the data received from the information terminal 20 according to the third communication standard. The power supply to the flash memory and the like may be performed by the button battery 114.

In response to the request from the information terminal 20, the control unit 112 reads data (for example, thumbnail information of a moving image and the like) from the second storage area 113B of the memory 113 and transmits the read data to the information terminal 20 according to the third communication standard. Also, in response to the request from the information terminal 20, the control unit 112 receives data from the information terminal 20 according to the third communication standard and stores the received data in the second storage area 113B of the memory 113.

The information terminal 20 may be able to access the first storage area 113A of the memory 113 according to the third communication standard. Specifically, the communication unit 111 may read data from the first storage area 113A of the memory 113 in response to the request from the information terminal 20 and transmit the read data to the information terminal 20 according to the third communication standard. In this case, the information terminal 20 can confirm whether or not the recording/reproduction device (the LTO drive) has accessed the CM 11 by referring to the tape withdrawal count (the thread count) stored in the first storage area 113A.

Modification Example 6

The tape cartridges 10 and 10A may include a universal serial bus (USB) terminal, and the CMs 11 and 11A may transmit/receive data to/from the information terminal 20 via the USB terminal. Also, the CMs 11 and 11A may be able to receive power from the information terminal 20 via the USB terminal.

Modification Example 7

The second storage area 113B of the memories 113 and 115 may store the recording date and time of the data for the magnetic tape MT and the image thumbnail of the data recorded in the magnetic tape MT. In this case, the information terminal 20 can read and confirm these data.

Modification Example 8

The visual information indicating that it is possible to communicate according to the second communication standard may be directly marked on the CMs 11 and 11A, and the cartridge case 12 may be made transparent.

Modification Example 9

In the first to third embodiments described above, the case where the present disclosure is applied to the tape cartridges 10 and 10A has been described, but the present disclosure is not limited to this case and can also be applied to disk cartridges that accommodates one or more optical disks. It is particularly preferred to apply the present disclosure to disk cartridges that accommodate two or more optical disks and are configured to be loadable and unloadable in the changer.

Modification Example 10

Also, the unique numbers of the tape cartridges 10 and 10A may be associated with the information related to the data stored in the tape cartridges 10 and 10A (for example, data name, type, capacity, reproduction time, thumbnail image, and the like to be stored in the database or the cloud server. In this case, by collating the database using the unique numbers of the tape cartridges 10 and 10A, it is possible to easily confirm what kind of data is stored in the tape cartridges 10 and 10A. Note that the information terminal 20 may be able to access the database or the cloud server by the wireless communication unit 22.

Modification Example 11

In the second and third embodiments described above, the case where the tension adjustment information is stored in the CM 11A has been described, but the tension adjustment information may be stored in the control device 59 of the recording/reproduction devices 50 and 50A. In this case, the control device 59 controls the rotation of the spindle drive device 53 and the reel drive device 54 by the tension adjustment information stored in the control device 59 and adjusts the tension applied in the longitudinal direction of the magnetic tape MT.

Modification Example 12

The magnetic tape MT may be used for the library device. In this case, the library device may have a configuration in which the tension applied in the longitudinal direction of the magnetic tape MT can be adjusted and include a plurality of the recording/reproduction devices 50 in the second embodiment or the recording/reproduction devices 50A in the third embodiment.

Modification Example 13

The magnetic tape MT is not limited to the perpendicular recording type magnetic tape and may be a horizontal recording type magnetic tape. In this case, needle-shaped magnetic powder such as metal magnetic powder and the like may be used as the magnetic powder.

Modification Example 14

In the second embodiment described above, the case where the distance between the servo bands SB is used as the width-related information related to the magnetic tape MT at the time of data recording has been described, but the width of the magnetic tape MT may be used.

In this case, the control device 59 calculates the width W1 of the magnetic tape MT from the distance d1 between the servo bands SB at the time of data recording and writes the width W1 to the CM 11A (the third storage area 113C of the memory 115) by the reader/writer 57.

The control device 59 reads the width W1 of the magnetic tape MT at the time of data recording from the CM 11A (the third storage area 113C of the memory 115) at the time of data reproduction and calculates the width W2 of the magnetic tape MT at the time of data reproduction from the distance d2 between the servo bands SB at the time of data reproduction. Then, the control device 59 calculates a difference ΔW between the width W1 of the magnetic tape MT at the time of data recording and the width W2 of the magnetic tape MT at the time of data reproduction and determines whether or not the difference ΔW is within a specified value.

In a case where the difference Δd is within the specified value, the control device 59 controls the rotational drive of the spindle 51 and the reel 52 so that the specified tension is maintained. On the other hand, in a case where the difference Δd is not within the specified value, the rotational drive of the spindle 51 and the reel 52 is controlled, and the tension applied to the traveling magnetic tape MT is adjusted, so that the difference Δd fits within the specified value.

Modification Example 15

In the third embodiment described above, the case where all of the temperature Tm1 and Tm2, the humidity H1 and H2, the tension Tn1 and Tn2, and the width W1 and W2 are used as the information at the time of data recording has been described, but the information at the time of data recording may be any one or a combination of any two or three of the temperature Tm1 and Tm2, the humidity H1 and H2, the tension Tn1 and Tn2, and the width W1 and W2.

In the CM 11A (the third storage area 113C of the memory 115), not only the information at the time of data recording (the temperature Tm1, the humidity H1, the tension Tn1, and the width W1) but also the information at the time of data reproduction (the temperature Tm2, the humidity H2, the tension Tn2, and the width W2) may be stored. For example, this information at the time of data reproduction is used when reproducing data in the magnetic tape MT at further another occasion after reproducing the data.

Modification Example 16

In the second and third embodiments described above, the case where the memory 115 further includes the third storage area 113C has been described, but the memory 115 may include the third storage area 113C instead of the second storage area 113B.

While the embodiments of the present disclosure have been specifically described above, the present disclosure is not limited to the above-described embodiments, and various modifications based on the technical idea of the present disclosure are possible.

For example, the configurations, methods, processes, shapes, materials, numerical values, and the like given in the above-described embodiments are merely examples, and it is possible to use different configurations, methods, processes, shapes, materials, numerical values, and the like if necessary.

Also, the configurations, methods, processes, shapes, materials, numerical values, and the like of the above-described embodiments can be combined with each other unless deviating from the gist of the present disclosure.

The chemical formulas of the compounds and the like exemplified in the above-described embodiments are typical and not limited to the stated valences and the like if they are the general names of the same compounds. In the numerical range described stepwise in the above-mentioned embodiments, the upper limit value or the lower limit value of the numerical range at one step may be replaced with the upper limit value or the lower limit value of the numerical range at another step. Unless otherwise specified, the materials exemplified in the above-described embodiments may be used alone or in a combination of two or more.

Also, the present disclosure may adopt the following configurations.

(1)
A cartridge memory used for a tape cartridge, the cartridge memory including:
a communication unit that performs wireless communication,
a control unit that transmits data to a recording/reproduction device according to a first communication standard via the communication unit, receives data from the recording/reproduction device according to the first communication standard via the communication unit, and transmits data to an information terminal according to a second communication standard via the communication unit, and
a storage unit that stores data related to the tape cartridge.

(2)
The cartridge memory according to (1), in which the first communication standard is compliant with a magnetic tape standard, and
the second communication standard is a near filed communication (NFC) standard.

(3)
The cartridge memory according to (2), in which the magnetic tape standard is the Linear Tape-Open (LTO) standard.

(4)
The cartridge memory according to any one of (1) to (3), in which
the control unit makes a determination whether a communication target device is the recording/reproduction device or the information terminal,
in a case where the communication target device is the recording/reproduction device, the control unit transmits data to the recording/reproduction device and receives data from the recording/reproduction device, and
in a case where the communication target device is the information terminal, the control unit transmits data to the information terminal.

(5)
The cartridge memory according to (4), in which the control unit makes the determination based on a command received from the communication target device via the communication unit.

(6)
The cartridge memory according to any one of (1) to (5), in which
the storage unit includes
a first storage area that stores data compliant with a magnetic tape standard, and
a second storage area that stores additional data.

(7)
The cartridge memory according to (6), in which
the control unit, in response to a request from the recording/reproduction device, reads data from the first storage area and transmits the data to the recording/reproduction device according to the first communication standard via the communication unit, and
the control unit, in response to a request from the information terminal, reads data from the first storage area or the second storage area and transmits the data to the information terminal according to the second communication standard via the communication unit.

(8)
The cartridge memory according to any one of (1) to (5), in which
the storage unit includes a first storage area and a second storage area,
the control unit further receives data from the information terminal according to the second communication standard via the communication unit, and
the control unit stores data received from the recording/reproduction device in the first storage area and stores data received from the information terminal in the second storage area.

(9)
The cartridge memory according to any one of (1) to (8), in which the data includes adjustment information for adjusting a tension applied in a longitudinal direction of a magnetic recording medium being tape-shaped.

(10)
The cartridge memory according to any one of (1) to (9), in which the data is acquired at the time of recording data on a magnetic recording medium being tape-shaped.

(11)
The cartridge memory according to any one of (1) to (10), in which the data includes width-related information related to a width of a magnetic recording medium being tape-shaped.

(12)

The cartridge memory according to (11), in which the width-related information is distance information between adjacent servo tracks or width information of the magnetic recording medium.

(13)

The cartridge memory according to any one of (1) to (12), in which the data includes environmental information around a magnetic recording medium being tape-shaped.

(14)

The cartridge memory according to (13), in which the environmental information includes temperature information around the magnetic recording medium.

(15)

The cartridge memory according to (13) or (14), in which the environmental information includes humidity information around the magnetic recording medium.

(16)

A tape cartridge including the cartridge memory according to any one of (1) to (15).

(17)

The tape cartridge according to (16), in which the communication unit includes an antenna, and visual information indicating that it is possible to perform communication according to the second communication standard is marked at a position where the antenna is provided.

(18)

The tape cartridge according to (16) or (17), further including a magnetic recording medium being tape-shaped, in which the magnetic recording medium satisfies the conditions:

$t_T \leq 5.5$ [μm], in which $t_T$ is an average thickness of the magnetic recording medium, and 650 [ppm/N]$\leq \Delta w$, in which $\Delta w$ is an amount of dimensional change in a width direction with respect to a tension change in a longitudinal direction of the magnetic recording medium.

(19)

A data management system including:

a tape cartridge that includes a cartridge memory, and an information terminal that reads data from the cartridge memory, in which the tape cartridge includes the cartridge memory according to any one of (1) to (15).

(20)

A cartridge memory used for a recording medium cartridge, the cartridge memory including:

a communication unit that performs wireless communication, a control unit that transmits data to a recording/reproduction device according to a first communication standard via the communication unit, receives data from the recording/reproduction device according to the first communication standard via the communication unit, and transmits data to an information terminal according to a second communication standard via the communication unit, and a storage unit that stores data related to the recording medium cartridge.

REFERENCE SIGNS LIST

10, 10A Tape cartridge
11, 11A Cartridge memory
12 Cartridge case
12A Lower shell 12A
12B Upper shell 12B
12C Outlet
13 Reel
13A Reel hub
13B Flange
14 Reel lock
15 Reel spring
16 Spider
17 Sliding door
18 Door spring
19 Write protection
20 Information terminal
21 CPU
22 Wireless communication unit
23 Voice processing unit
24 Speaker
25 Microphone
26 Wireless communication unit
27 NFC communication unit
28 Display device
29 Touch panel
30 Storage unit
31 Power supply unit
41 Base
42 Base layer
43 Magnetic layer
44 Back layer
50, 50A Recording/reproduction device
51 Spindle 51
52 Reel 52
53 Spindle drive device
54 Reel drive device
55 Guide roller
56 Head unit
57 Reader/writer
58 Communication interface
59 Control device
60 Thermometer
61 Hygrometer
70 Network
71 Server
72 Personal computer
100 Data management system
101, 101A Recording/reproduction system
111 Communication unit
111A Antenna coil
112 Control unit
112A First mode
112B Second mode
113, 115 Memory
113A First storage area
113B Second storage area
113C Third storage area
120 Servo frame
121 Servo subframe 1
121A A burst
121B B burst
122 Servo subframe 2
122C C burst
122D D burst
123 Servo stripe
MT Magnetic tape

The invention claimed is:

1. A cartridge memory used for a tape cartridge, the cartridge memory comprising:

a communication unit that performs wireless communication;

a control unit that transmits data to a recording/reproduction device according to a first communication standard via the communication unit, receives data from the recording/reproduction device according to the first communication standard via the communication unit, and transmits data to an information terminal according to a second communication standard via the communication unit; and a storage unit that stores data related to the tape cartridge, wherein the control unit makes a determination whether a communication target device is the recording/reproduction device or the information terminal, in a case where the communication target device is the recording/reproduction device, the control unit transmits data to the recording/reproduction device and receives data from the recording/reproduction device, and in a case where the communication target device is the information terminal, the control unit transmits data to the information terminal, wherein the first communication standard is a short-range wireless communication standard defined for the cartridge memory in a Linear Tape-Open (LTO) standard.

2. The cartridge memory according to claim 1, wherein the second communication standard is a near field communication (NFC) standard.

3. The cartridge memory according to claim 1, wherein the control unit makes the determination based on a command received from the communication target device via the communication unit.

4. The cartridge memory according to claim 1, wherein the data includes adjustment information for adjusting a tension applied in a longitudinal direction of a magnetic recording medium being tape-shaped.

5. The cartridge memory according to claim 1, wherein the data is acquired at a time of recording data on a magnetic recording medium being tape-shaped.

6. The cartridge memory according to claim 1, wherein the data includes width-related information related to a width of a magnetic recording medium being tape-shaped.

7. The cartridge memory according to claim 6, wherein the width-related information is distance information between adjacent servo tracks or width information of the magnetic recording medium.

8. The cartridge memory according to claim 1, wherein the data includes environmental information around a magnetic recording medium being tape-shaped.

9. The cartridge memory according to claim 8, wherein the environmental information includes temperature information around the magnetic recording medium.

10. The cartridge memory according to claim 8, wherein the environmental information includes humidity information around the magnetic recording medium.

11. A tape cartridge comprising a cartridge memory, wherein the cartridge memory includes:

a communication unit that performs wireless communication;

a control unit that transmits data to a recording/reproduction device according to a first communication standard via the communication unit, receives data from the recording/reproduction device according to the first communication standard via the communication unit, and transmits data to an information terminal according to a second communication standard via the communication unit; and a storage unit that stores data related to the tape cartridge, wherein the control unit makes a determination whether a communication target device is the recording/reproduction device or the information terminal, in a case where the communication target device is the recording/reproduction device, the control unit transmits data to the recording/reproduction device and receives data from the recording/reproduction device, and in a case where the communication target device is the information terminal, the control unit transmits data to the information terminal, wherein the first communication standard is a short-range wireless communication standard defined for the cartridge memory in a Linear Tape-Open (LTO) standard, and wherein the tape cartridge further includes a reel on which a magnetic recording medium is provided.

12. The tape cartridge according to claim 11, wherein the communication unit includes an antenna.

13. The tape cartridge according to claim 11, wherein the magnetic recording medium being tape-shaped, and wherein the magnetic recording medium satisfies the conditions:

$t_T < 5.5$ [μm], in which $t_T$ is an average thickness of the magnetic recording medium; and 650 [ppm/N] ≤ Δw, in which Δw is an amount of dimensional change in a width direction with respect to a tension change in a longitudinal direction of the magnetic recording medium.

14. A cartridge memory used for a tape cartridge, the cartridge memory comprising:

a communication unit that performs wireless communication;

a control unit that transmits data to a recording/reproduction device according to a first communication standard via the communication unit, receives data from the recording/reproduction device according to the first communication standard via the communication unit, and transmits data to an information terminal according to a second communication standard via the communication unit; and a storage unit that stores data related to the tape cartridge, wherein the storage unit includes:

a first storage area that stores data compliant with a magnetic tape standard; and a second storage area that stores additional data, wherein the control unit, in response to a request from the recording/reproduction device, reads data from the first storage area and transmits the data to the recording/reproduction device according to the first communication standard via the communication unit, and the control unit, in response to a request from the information terminal, reads data from the first storage area or the second storage area and transmits the data to the information terminal according to the second communication standard via the communication unit, wherein the first communication standard is a short-range wireless communication standard defined for the cartridge memory in a Linear Tape-Open (LTO) standard.

15. A cartridge memory used for a tape cartridge, the cartridge memory comprising:

a communication unit that performs wireless communication;

a control unit that transmits data to a recording/reproduction device according to a first communication standard via the communication unit, receives data from the recording/reproduction device according to the first communication standard via the communication unit, and transmits data to an information terminal according to a second communication standard via the communication unit; and a storage unit that stores data related to the tape cartridge, wherein the storage unit includes a first storage area and a second storage area, the control unit further receives data from the information terminal according to the second communication standard via the communication unit, and the control unit stores data received from the recording/reproduction device in the first storage area and stores data received from the information terminal in the second storage area, wherein the first communication standard is a short-range wireless communication standard defined for the cartridge memory in a Linear Tape-Open (LTO) standard.

16. A data management system comprising:

a tape cartridge that includes a cartridge memory; and an information terminal that reads data from the cartridge memory, wherein the tape cartridge includes the cartridge memory, wherein the cartridge memory includes:

a communication unit that performs wireless communication;

a control unit that transmits data to a recording/reproduction device according to a first communication standard via the communication unit, receives data from the recording/reproduction device according to the first communication standard via the communication unit, and transmits data to an information terminal according to a second communication standard via the communication unit; and a storage unit that stores data related to the tape cartridge, wherein the control unit makes a determination whether a communication target device is the recording/reproduction device or the information terminal, in a case where the communication target device is the recording/reproduction device, the control unit transmits data to the recording/reproduction device and receives data from the recording/reproduction device, and in a case where the communication target device is the information terminal, the control unit transmits data to the information terminal, wherein the first communication standard is a short-range wireless communication standard defined for the cartridge memory in a Linear Tape-Open (LTO) standard.

17. A cartridge memory used for a recording medium cartridge, the cartridge memory comprising:

a communication unit that performs wireless communication;

a control unit that transmits data to a recording/reproduction device according to a first communication standard via the communication unit, receives data from the recording/reproduction device according to the first communication standard via the communication unit, and transmits data to an information terminal according to a second communication standard via the communication unit; and a storage unit that stores data related to the recording medium cartridge, wherein the control unit makes a determination whether a communication target device is the recording/reproduction device or the information terminal, in a case where the communication target device is the recording/reproduction device, the control unit transmits data to the recording/reproduction device and receives data from the recording/reproduction device, and in a case where the communication target device is the information terminal, the control unit transmits data to the information terminal, wherein the first communication standard is a short-range wireless communication standard defined for the cartridge memory in a Linear Tape-Open (LTO) standard.

* * * * *